United States Patent
Huang et al.

(10) Patent No.: US 12,389,347 B2
(45) Date of Patent: Aug. 12, 2025

(54) INDICATION OF SYNCHRONIZATION SIGNAL AND PHYSICAL BROADCASTING CHANNEL BLOCK TRANSMISSION BEAM ADJUSTMENT

(71) Applicant: Qualcomm Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 17/764,457

(22) PCT Filed: Oct. 10, 2019

(86) PCT No.: PCT/CN2019/110350
§ 371 (c)(1),
(2) Date: Mar. 28, 2022

(87) PCT Pub. No.: WO2021/068161
PCT Pub. Date: Apr. 15, 2021

(65) Prior Publication Data
US 2022/0352962 A1 Nov. 3, 2022

(51) Int. Cl.
*H04B 7/06* (2006.01)
*H04B 7/08* (2006.01)
(Continued)

(52) U.S. Cl.
CPC .......... *H04B 7/0695* (2013.01); *H04B 7/088* (2013.01); *H04L 5/0048* (2013.01); *H04W 56/001* (2013.01)

(58) Field of Classification Search
CPC ..... H04B 7/0695; H04B 7/088; H04L 5/0048; H04W 56/001
See application file for complete search history.

(56) References Cited

U.S. PATENT DOCUMENTS 10,631,299 B2    4/2020    Chen et al.
2018/0270691 A1    9/2018    Chendamarai Kannan et al.
(Continued)

FOREIGN PATENT DOCUMENTS

CN    109150443 A    1/2019
CN    109661842    4/2019
(Continued)

OTHER PUBLICATIONS

Huang et al., "Method and Apparatus for Reporting Beam Information, and Method and Apparatus for Determining Beam Information", Jan. 17, 2019, WO, WO 2019011248. (Year: 2019).*

(Continued)

*Primary Examiner* — Michael K Phillips
(74) *Attorney, Agent, or Firm* — Holland & Hart LLP/Qualcomm

(57) ABSTRACT

Methods, systems, and devices for wireless communications are described. Generally, a base station may send, and a user equipment (UE) may receive, a transmission beam adjustment message indicating a change from a first time interval to a second time interval in which a transmission beam is utilized to transmit a synchronization signal and physical broadcasting channel block (SSB). The base station may send the transmission beam adjustment message to all connected UEs, individual UEs affected by the adjustment, or to one or more UE groups. The UE may receive the transmission beam adjustment message and determine a new time interval of the transmission beam pattern that the base station is using the transmission beam to transmit the SSB. The UE may monitor the new time interval for the SSB using a receive beam that corresponds to the transmission beam.

35 Claims, 21 Drawing Sheets

(51) Int. Cl.
*H04L 5/00* (2006.01)
*H04W 56/00* (2009.01)

(56) References Cited

U.S. PATENT DOCUMENTS

| | | | | |
|---|---|---|---|---|
| 2018/0279380 | A1* | 9/2018 | Jung | H04W 56/0005 |
| 2018/0343156 | A1 | 11/2018 | Malik et al. | |
| 2019/0013857 | A1* | 1/2019 | Zhang | H04W 74/04 |
| 2019/0207737 | A1* | 7/2019 | Babaei | H04L 27/2607 |
| 2019/0274096 | A1* | 9/2019 | Ingale | H04W 48/02 |
| 2020/0045745 | A1* | 2/2020 | Cirik | H04W 74/0833 |
| 2020/0068548 | A1* | 2/2020 | Guan | H04W 72/23 |
| 2020/0100154 | A1* | 3/2020 | Cirik | H04W 36/0072 |
| 2020/0145998 | A1* | 5/2020 | Sun | H04B 7/0695 |
| 2020/0205095 | A1* | 6/2020 | Åström | H04W 48/12 |
| 2020/0296635 | A1* | 9/2020 | Rastegardoost | H04W 36/0064 |
| 2020/0305099 | A1 | 9/2020 | Liu | |
| 2020/0373992 | A1* | 11/2020 | Wang | H04B 7/0626 |
| 2021/0211957 | A1* | 7/2021 | Kamohara | H04W 36/06 |
| 2021/0307078 | A1* | 9/2021 | Singh | H04W 48/16 |
| 2022/0060297 | A1* | 2/2022 | Tomeba | H04B 7/063 |
| 2022/0294497 | A1* | 9/2022 | Choi | H04J 11/00 |

FOREIGN PATENT DOCUMENTS

| | | | | |
|---|---|---|---|---|
| WO | WO-2018048619 | | 3/2018 | |
| WO | WO-2018217471 | A1 | 11/2018 | |
| WO | WO-2019011248 | A1 * | 1/2019 | H04W 16/28 |
| WO | WO-2019022930 | A1 | 1/2019 | |
| WO | WO-2019056210 | A1 | 3/2019 | |
| WO | WO-2019221567 | A1 * | 11/2019 | |

OTHER PUBLICATIONS

Seo et al., "Uplink/Downlink Configuration Information Transmission and Reception Method in Wireless Communication System and Communication Device Using Said Method", Nov. 21, 2019, WO, WO 2019221567 (Year: 2019).*
Ericsson, "NR System information distribution—principles and example", Oct. 10-14, 2016, 3GPP, R2-166773 (Year: 2016).*
ETSI, "5G; NR; Requirements for support for radio resource management (3GPP TS 38.133 version 15.6.0 Release 15)", Jul. 2019, ETSI, ETSI TS 138 133 V15.6.0 (Year: 2019).*
Huawei et al., "On QCL Indication and Time Repetition of SS Blocks", 3GPP TSG RAN WG1 Meeting NR#3, R1-1715565, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017 Sep. 17, 2017, XP051339032, 2 Pages, Section 2.
Huawei et al., "Discussion and Evaluation on NR-SS Periodicity", 3GPP TSG RAN WG1 Meeting #88, R1-1701721, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017, XP051208887, 4 Pages, Section 2.
Huawei et al., "NR Primary and Secondary Synchronization Signals Design", 3GPP TSG RAN WG1 Meeting #87, R1-1611261, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016 Nov. 13, 2016, XP051175242, 10 Pages, Section 2.3.
Qualcomm Incorporated: "Multi-Beam SYNC Design", 3GPP TSG RAN WG1 Meeting #86b, R1-1610159, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, XP051150182, 9 Pages, Section 2.7.
Supplementary European Search Report—EP19948786—Search Authority—Munich—May 9, 2023.
Huawei, et al., "Initial Access in NR Unlicensed", 3GPP Draft, 3GPP TSG RAN WG1 Meeting #95, R1-1812195, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051478351, 10 Pages, Retrieved from the Internet: URL: http://www.3gpp.org/ftp/tsg%5Fran/WG1%5FRL1/TSGR1%5F95/Docs/R1%2D1812195%2Ezip, [retrieved on Nov. 3, 2018], the whole document.
International Search Report and Written Opinion—PCT/CN2019/110350—ISAEPO—Jun. 28, 2020.

* cited by examiner

INDICATION OF SYNCHRONIZATION SIGNAL AND PHYSICAL BROADCASTING CHANNEL BLOCK TRANSMISSION BEAM ADJUSTMENT

CROSS REFERENCE

The present Application is a 371 national stage filing of International PCT Application No. PCT/CN2019/110350 by Huang et al., entitled "INDICATION OF SYNCHRONIZATION SIGNAL AND PHYSICAL BROADCASTING CHANNEL BLOCK TRANSMISSION BEAM ADJUSTMENT," filed Oct. 10, 2019, which is assigned to the assignee hereof, and which is expressly incorporated by reference in its entirety herein.

FIELD OF TECHNOLOGY

The following relates generally to wireless communications and more specifically to indication of synchronization signal and physical broadcasting channel block transmission beam adjustment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may communicate with one or more other base stations, and one or more UEs. In some example of a wireless communications system, a base station and a UE may synchronize communications, or establish a connection, or both, using one or more synchronization signal blocks transmitted via one or more transmission beams. Conventional techniques for beamforming and synchronization may be deficient.

SUMMARY

The described techniques relate to improved methods, systems, devices, and apparatuses that support an indication of synchronization signal and physical broadcasting channel block (SSB) transmission beam adjustment. Generally, a base station may send an SSB to a user equipment (UE) during one or more time intervals using one or more transmission beams, according to a transmission beam pattern. A UE may monitor for SSBs during a preferred time interval during which the base station transmits the SSB using a preferred beam, according to the transmission beam pattern. If the base station changes the order of one or more transmission beams in the pattern, it may notify one or more served UEs of the change. Thus, the base station may send, and the UE may receive, a transmission beam adjustment message indicating a change from a first time interval to a second time interval in which a transmission beam is utilized to transmit an SSB. The base station may send the transmission beam adjustment message to all connected UEs, individual UEs affected by the adjustment, or to one or more UE groups. The UE may receive the transmission beam adjustment message and determine a new time interval of the transmission beam pattern in which the base station is using the transmission beam to transmit the SSB. The UE may monitor the new time interval for the SSB using a receive beam that corresponds to the transmission beam.

A method of wireless communications by a UE is described. The method may include receiving a transmission beam adjustment message indicating a change from a first time interval to a second time interval in which a transmission beam is utilized to transmit a synchronization signal and physical broadcasting channel block and monitoring, during the second time interval, the synchronization signal and physical broadcasting channel block using a receive beam that corresponds to the transmission beam.

An apparatus for wireless communications by a UE is described. The apparatus may include a processor, memory coupled with the processor, and instructions stored in the memory. The instructions may be executable by the processor to cause the apparatus to receive a transmission beam adjustment message indicating a change from a first time interval to a second time interval in which a transmission beam is utilized to transmit a synchronization signal and physical broadcasting channel block and monitor, during the second time interval, the synchronization signal and physical broadcasting channel block using a receive beam that corresponds to the transmission beam.

Another apparatus for wireless communications by a UE is described. The apparatus may include means for receiving a transmission beam adjustment message indicating a change from a first time interval to a second time interval in which a transmission beam is utilized to transmit a synchronization signal and physical broadcasting channel block and monitoring, during the second time interval, the synchronization signal and physical broadcasting channel block using a receive beam that corresponds to the transmission beam.

A non-transitory computer-readable medium storing code for wireless communications by a UE is described. The code may include instructions executable by a processor to receive a transmission beam adjustment message indicating a change from a first time interval to a second time interval in which a transmission beam is utilized to transmit a synchronization signal and physical broadcasting channel block and monitor, during the second time interval, the synchronization signal and physical broadcasting channel block using a receive beam that corresponds to the transmission beam.

In some examples of the method, apparatuses, and non-transitory computer-readable medium described herein, monitoring, during the second time interval, the synchronization signal and physical broadcasting channel block may include operations, features, means, or instructions for receiving, during the second time interval, the synchronization signal and physical broadcasting channel block using the receive beam.

In some examples of the method, apparatuses, and non-transitory computer-readable medium described herein, receiving the transmission beam adjustment message may include operations, features, means, or instructions for receiving the transmission beam adjustment message indicating a change of one or more time intervals in which at least one transmission beam of a transmission beam pattern may be utilized.

Some examples of the method, apparatuses, and non-transitory computer-readable medium described herein may further include operations, features, means, or instructions for receiving a second transmission beam adjustment message indicating the transmission beam may be no longer utilized for any time interval of a transmission beam pattern.

Some examples of the method, apparatuses, and non-transitory computer-readable medium described herein may further include operations, features, means, or instructions for performing beam scanning to identify a second transmission beam and a corresponding time interval in which the second transmission beam may be utilized to transmit a second synchronization signal and physical broadcasting channel block.

In some examples of the method, apparatuses, and non-transitory computer-readable medium described herein, receiving the transmission beam adjustment message may include operations, features, means, or instructions for receiving the transmission beam adjustment message indicating a transmission beam index array that indicates that a respective transmission beam of a transmission beam pattern may be utilized for a respective time interval of a se of different time intervals.

In some examples of the method, apparatuses, and non-transitory computer-readable medium described herein, a respective element of the transmission beam index array indicates a respective time interval of the set of different time intervals, and where at least one transmission beam may be utilized prior to receiving the transmission beam adjustment message.

In some examples of the method, apparatuses, and non-transitory computer-readable medium described herein, the transmission beam index array includes a defined value corresponding to at least one time interval of the se of different time intervals to indicate that a new transmission beam may be being utilized to transmit within the at least one time interval.

Some examples of the method, apparatuses, and non-transitory computer-readable medium described herein may further include operations, features, means, or instructions for receiving first control signaling that indicates a synchronization signal and physical broadcasting channel block periodicity, where the synchronization signal and physical broadcasting channel block repeats using a set of transmission beams in accordance with the synchronization signal and physical broadcasting channel block periodicity.

Some examples of the method, apparatuses, and non-transitory computer-readable medium described herein may further include operations, features, means, or instructions for receiving second control signaling that indicates a master information block periodicity, where the master information block periodicity may have a longer duration than the synchronization signal and physical broadcasting channel block periodicity.

In some examples of the method, apparatuses, and non-transitory computer-readable medium described herein, receiving the transmission beam adjustment message may include operations, features, means, or instructions for receiving the transmission beam adjustment message that may be individually addressed to the UE.

In some examples of the method, apparatuses, and non-transitory computer-readable medium described herein, the transmission beam adjustment message indicates the second time interval, and where the transmission beam of the synchronization signal and physical broadcasting channel block that may be received by the UE prior to receiving the transmission beam adjustment message may be utilized in the second time interval after receiving the transmission beam adjustment message.

In some examples of the method, apparatuses, and non-transitory computer-readable medium described herein, the transmission beam adjustment message indicates that the transmission beam of the synchronization signal and physical broadcasting channel block that may be received by the UE prior to receiving the transmission beam adjustment message may be not to be utilized after receiving the transmission beam adjustment message.

In some examples of the method, apparatuses, and non-transitory computer-readable medium described herein, the transmission beam adjustment message may be a dedicated radio resource control message, a dedicated medium access control (MAC) control element (CE), dedicated downlink control information, or any combination thereof.

In some examples of the method, apparatuses, and non-transitory computer-readable medium described herein, receiving the transmission beam adjustment message may include operations, features, means, or instructions for receiving the transmission beam adjustment message that may be addressed to a group of UEs that includes the UE.

In some examples of the method, apparatuses, and non-transitory computer-readable medium described herein, the transmission beam adjustment message indicates the second time interval, and where the transmission beam of the synchronization signal and physical broadcasting channel block that may be received by the group of UEs that includes the UE prior to receiving the transmission beam adjustment message may be utilized in the second time interval after receiving the transmission beam adjustment message.

In some examples of the method, apparatuses, and non-transitory computer-readable medium described herein, the transmission beam adjustment message indicates that the transmission beam of the synchronization signal and physical broadcasting channel block that may be received by the group of UEs that includes the UE prior to receiving the transmission beam adjustment message may be not to be utilized during any time interval after receiving the transmission beam adjustment message.

In some examples of the method, apparatuses, and non-transitory computer-readable medium described herein, the transmission beam adjustment message may be group-common downlink control information.

Some examples of the method, apparatuses, and non-transitory computer-readable medium described herein may further include operations, features, means, or instructions for receiving a first synchronization signal and physical broadcasting channel block value during the first time interval prior to receiving the transmission beam adjustment message and a second synchronization signal and physical broadcasting channel block value during the second time interval after receiving the transmission beam adjustment message, and combining the first synchronization signal and physical broadcasting channel block value with the second synchronization signal and physical broadcasting channel block value to detect a synchronization signal, decode a physical broadcasting channel, or both.

Some examples of the method, apparatuses, and non-transitory computer-readable medium described herein may further include operations, features, means, or instructions for transmitting a random access preamble during a random access resource corresponding to the second time interval.

Some examples of the method, apparatuses, and non-transitory computer-readable medium described herein may further include operations, features, means, or instructions for receiving data transfer quasi co-location information that indicates the second time interval, and monitoring for a data transmission using the receive beam based on the data transfer quasi co-location information.

In some examples of the method, apparatuses, and non-transitory computer-readable medium described herein, the transmission beam adjustment message may be common downlink control information addressed to a common radio network temporary identifier.

A method of wireless communications by a base station is described. The method may include transmitting, to a UE, a transmission beam adjustment message indicating a change from a first time interval to a second time interval in which a transmission beam is utilized to transmit a synchronization signal and physical broadcasting channel block and transmitting, during the second time interval, the synchronization signal and physical broadcasting channel block using the transmission beam.

An apparatus for wireless communications by a base station is described. The apparatus may include a processor, memory coupled with the processor, and instructions stored in the memory. The instructions may be executable by the processor to cause the apparatus to transmit, to a UE, a transmission beam adjustment message indicating a change from a first time interval to a second time interval in which a transmission beam is utilized to transmit a synchronization signal and physical broadcasting channel block and transmit, during the second time interval, the synchronization signal and physical broadcasting channel block using the transmission beam.

Another apparatus for wireless communications by a base station is described. The apparatus may include means for transmitting, to a UE, a transmission beam adjustment message indicating a change from a first time interval to a second time interval in which a transmission beam is utilized to transmit a synchronization signal and physical broadcasting channel block and transmitting, during the second time interval, the synchronization signal and physical broadcasting channel block using the transmission beam.

A non-transitory computer-readable medium storing code for wireless communications by a base station is described. The code may include instructions executable by a processor to transmit, to a UE, a transmission beam adjustment message indicating a change from a first time interval to a second time interval in which a transmission beam is utilized to transmit a synchronization signal and physical broadcasting channel block and transmit, during the second time interval, the synchronization signal and physical broadcasting channel block using the transmission beam.

In some examples of the method, apparatuses, and non-transitory computer-readable medium described herein, transmitting the transmission beam adjustment message may include operations, features, means, or instructions for transmitting the transmission beam adjustment message indicating a change of one or more time intervals in which at least one transmission beam of a transmission beam pattern may be utilized.

Some examples of the method, apparatuses, and non-transitory computer-readable medium described herein may further include operations, features, means, or instructions for transmitting a second transmission beam adjustment message indicating the transmission beam may be no longer utilized for any time interval of a transmission beam pattern.

In some examples of the method, apparatuses, and non-transitory computer-readable medium described herein, transmitting the transmission beam adjustment message may include operations, features, means, or instructions for transmitting the transmission beam adjustment message indicating a transmission beam index array that indicates that a respective transmission beam of a transmission beam pattern may be utilized for a respective time interval of a set of different time intervals.

In some examples of the method, apparatuses, and non-transitory computer-readable medium described herein, a respective element of the transmission beam index array indicates a respective time interval of the set of different time intervals, and where at least one transmission beam may be utilized prior to receiving the transmission beam adjustment message.

In some examples of the method, apparatuses, and non-transitory computer-readable medium described herein, the transmission beam index array includes a defined value corresponding to at least one time interval of the set of different time intervals to indicate that a new transmission beam may be being utilized to transmit within the at least one time interval.

Some examples of the method, apparatuses, and non-transitory computer-readable medium described herein may further include operations, features, means, or instructions for transmitting first control signaling that indicates a synchronization signal and physical broadcasting channel block periodicity, where the synchronization signal and physical broadcasting channel block repeats in accordance with the synchronization signal and physical broadcasting channel block periodicity.

Some examples of the method, apparatuses, and non-transitory computer-readable medium described herein may further include operations, features, means, or instructions for transmitting second control signaling that indicates a master information block periodicity, where the master information block periodicity may have a longer duration than the synchronization signal and physical broadcasting channel block periodicity.

In some examples of the method, apparatuses, and non-transitory computer-readable medium described herein, transmitting the transmission beam adjustment message may include operations, features, means, or instructions for transmitting the transmission beam adjustment message that may be individually addressed to the UE.

In some examples of the method, apparatuses, and non-transitory computer-readable medium described herein, the transmission beam of the synchronization signal and physical broadcasting channel block that may be received by the UE prior to receiving the transmission beam adjustment message may be utilized in the second time interval after receiving the transmission beam adjustment message.

In some examples of the method, apparatuses, and non-transitory computer-readable medium described herein, the transmission beam adjustment message indicates that the transmission beam of the synchronization signal and physical broadcasting channel block that may be received by the UE prior to receiving the transmission beam adjustment message may be not to be utilized after receiving the transmission beam adjustment message.

In some examples of the method, apparatuses, and non-transitory computer-readable medium described herein, the transmission beam adjustment message may be a dedicated radio resource control message, a dedicated MAC CE, dedicated downlink control information, or any combination thereof.

In some examples of the method, apparatuses, and non-transitory computer-readable medium described herein, transmitting the transmission beam adjustment message may include operations, features, means, or instructions for transmitting the transmission beam adjustment message that may be addressed to a group of UEs that includes the UE.

In some examples of the method, apparatuses, and non-transitory computer-readable medium described herein, the transmission beam adjustment message indicates the second time interval, and where the transmission beam of the synchronization signal and physical broadcasting channel block that may be received by the group of UEs that includes the UE prior to receiving the transmission beam adjustment message may be utilized in the second time interval after receiving the transmission beam adjustment message.

In some examples of the method, apparatuses, and non-transitory computer-readable medium described herein, the transmission beam adjustment message indicates that the transmission beam of the synchronization signal and physical broadcasting channel block that may be received by the group of UEs that includes the UE prior to receiving the transmission beam adjustment message may be not to be utilized during any time interval after receiving the transmission beam adjustment message.

In some examples of the method, apparatuses, and non-transitory computer-readable medium described herein, the transmission beam adjustment message may be group-common downlink control information.

Some examples of the method, apparatuses, and non-transitory computer-readable medium described herein may further include operations, features, means, or instructions for receiving a random access preamble during a random access resource corresponding to the second time interval.

Some examples of the method, apparatuses, and non-transitory computer-readable medium described herein may further include operations, features, means, or instructions for transmitting data transfer quasi co-location information that indicates the second time interval, and transmitting a data transmission using the transmission beam based on the data transfer quasi co-location information.

In some examples of the method, apparatuses, and non-transitory computer-readable medium described herein, the transmission beam adjustment message may be common downlink control information addressed to a common radio network temporary identifier.

DETAILED DESCRIPTION

Figure 1:
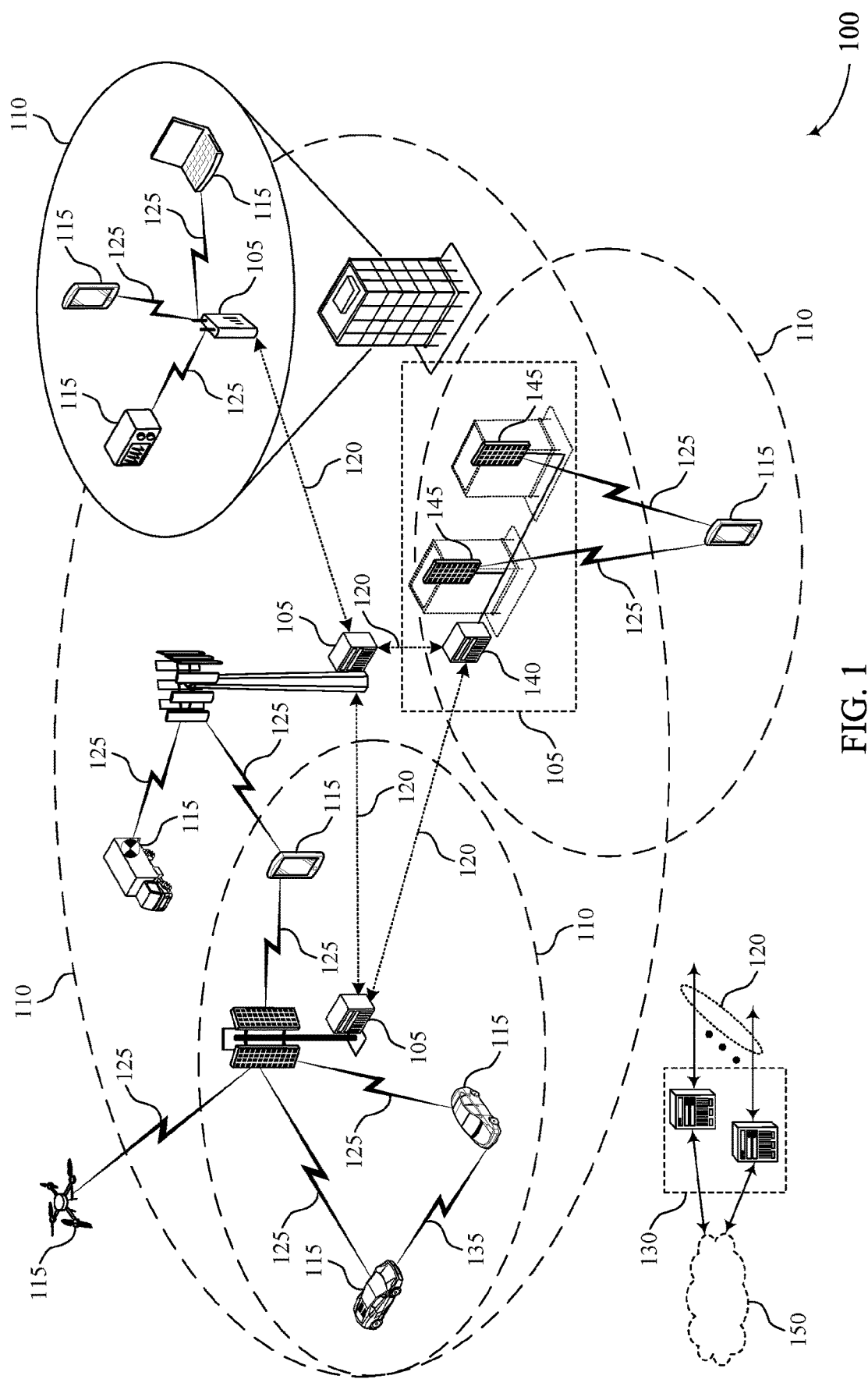
FIG. 1 illustrates an example of a system for wireless communications that supports indication of synchronization signal and physical broadcasting channel block transmission beam adjustment in accordance with aspects of the present disclosure.

In some examples of a wireless communications systems, a base station and a user equipment (UE) may synchronize communications, establish a connection, or both, using one or more Synchronization Signal and a physical broadcasting channel Blocks (SSBs). For example, a base station may transmit an SSB to a UE. The SSB may include one or more primary synchronization signal (PSS) and one or more secondary synchronization signals (SSS). The UE may use the PSS and SSS to synchronize with the base station, and the PBCH of the SSB may include a master information block (MIB). The MIB may include basic information permitting the UE to establish a connection with the base station. Having established a connection with the base station, the base station may send SSB transmissions using one or more transmission beams in a fixed, repeating pattern, so as to keep the SSB reception performance steady and consistent for each served UE. For instance, the base station may transmit SSBs during a set of time intervals (e.g., SSB positions) within a time period (e.g., an SSB period).

The base station may transmit an SSB on a set of transmission beams within a respective SSB position of a particular SSB period. That is, the base station may transmit a first SSB during a first time interval of the SSB period using a first transmission beam, a second SSB during a second time interval of the SSB period using a second transmission beam, a third SSB during a third time interval of the SSB period using a third transmission beam, etc. During a subsequent SSB period, the base station may send SSBs using the same SSB transmission beam pattern. A UE may perform a beam scanning procedure to measure the SSBs at each SSB position using one or more receive beams, identify a preferred transmission beam corresponding to one of the SSB positions, monitor that SSB position in subsequent SSB period using a receive beam that corresponds to a preferred transmission beam, and synchronize with the base station and/or decode the PBCH.

In some cases, a base station may operate in a full-duplex mode. In such examples, the base station may be an integrated access backhaul (IAB) node. An IAB node may communicate with a parent node via a parent link, a child node via a child link, and one or more served UEs. These multiple communication paths may result in self-interference. Thus, an IAB node may select transmission beams on which to send SSBs (e.g., the SSB transmission beam pattern) based on which beams experience a smallest self-interference and largest channel gain. In some cases, a base station (e.g., IAB node) may change in which time interval a particular beam is used to transmit an SSB within an SSB period. For instance, the base station may change its downlink beams based on detection of newly emerged obstacles, movement of one or more nodes or base stations, or the like. However, in such cases, a UE may be unaware of such changes.

Conventional systems may lack signaling to permit a base station to inform a UE that a time interval (e.g., SSB position) in which a transmission beam is being utilized for transmitting an SSB has changed from one SSB period to the next SSB period. The base station may transmit the SSBs using respective transmission beams in a transmission beam pattern that repeats in accordance with an SSB periodicity. Changing which transmission beam is being used to transmit an SSB during a particular SSB position may result in radio link failure due to the UE being unaware that the base station is using a different, second transmission beam to transmit the SSB at that SSB position. Radio link failure may occur as the receive beam of the UE that corresponds to the first transmission beam may be misaligned with the direction of the second transmission beam, and hence the UE measurement of the SSB may indicate a low signal value. When the UE detects radio link failure, the UE may experience latency by having to undergo beam scanning to identify another beam to reestablish a radio link with the base station.

To avoid such delays and decrease latency using the techniques described herein, the base station may inform one or more UEs that a time interval at which a transmission beam is currently being used will be or has been changed from one time interval to a new time interval during a next or subsequent SSB period. For example, the base station may send a transmission beam adjustment message to one or more UEs to indicate a change to the SSB transmission beam pattern. The base station may send the transmission beam adjustment message to all connected UEs, individual UEs affected by the adjustment, or to one or more UE groups. The UE may receive the transmission beam adjustment message and determine the new SSB position within the SSB period that the base station is using the transmission beam to transmit the SSB. The UE may monitor the new SSB position for the SSB using a receive beam that corresponds to the transmission beam. The UE may thus monitor for the SSB at the new SSB position of an SSB period indicated in the transmission beam adjustment message without experiencing beam mismatch nor having to undergo beam scanning should radio link failure be detected due to the beam mismatch.

Particular aspects of the subject matter described herein may be implemented to realize one or more advantages. The described techniques may support improvements to SSB signaling, decreased device and system latency, and improved user experience. As such, supported techniques may include improved network operations and, in some examples, may promote network efficiencies, among other benefits.

Aspects of the disclosure are initially described in the context of wireless communications systems. Aspects of the disclosure are further illustrated by and described with reference to resource allocations, timelines, and process flows. Aspects of the disclosure are further illustrated by and described with reference to apparatus diagrams, system diagrams, and flowcharts that relate to indication of synchronization signal and physical broadcasting channel block transmission beam adjustment.

FIG. 1 illustrates an example of a wireless communications system 100 that supports indication of synchronization signal and physical broadcasting channel block transmission beam adjustment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more MVPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via, one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication), M2M communication or MTC may refer to data communication technologies that allow devices to communicate with one another or a base station 105 without human intervention. In some examples, NUM communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RE's)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPS). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and RIF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (IAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MINIM where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmission beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UE 115 may receive a transmission beam adjustment message indicating a change from a first time interval to a second time interval in which a transmission beam is utilized to transmit a synchronization signal and physical broadcasting channel block, and may monitor during the second time interval, the synchronization signal and physical broadcasting channel block using a receive beam that corresponds to the transmission beam. Some advantages to the UE 115 receiving the transmission beam adjustment message and monitoring for the SSB during the second time interval may include improvements to SSB signaling, decreased device and system latency, and improved user experience.

In some examples, the transmission beam adjustment message may be individually addressed to the UE 115. Some advantages to the UE 115 of addressing the transmission beam adjustment message to the UE 115 may include improvements to SSB signaling, decreased device and system latency, and improved user experience.

In some examples, the transmission beam adjustment message may be individually addressed to a group of UEs 115. Some advantages to the UE 115 of addressing the transmission beam adjustment message to the group of UEs 115 may include improvements to SSB signaling, decreased device and system latency, and improved user experience.

In some examples, the UE 115 may receive a transmission beam adjustment message indicating a change from a first time interval to a second time interval in which a transmission beam is utilized to transmit a synchronization signal and physical broadcasting channel block, and may monitor during the second time interval, the synchronization signal and physical broadcasting channel block using a receive beam that corresponds to the transmission beam. Some advantages to the UE 115 receiving the transmission beam adjustment message and monitoring for the SSB during the second time interval may support improvements to SSB signaling, decreased device and system latency, and improved user experience.

Figure 2:
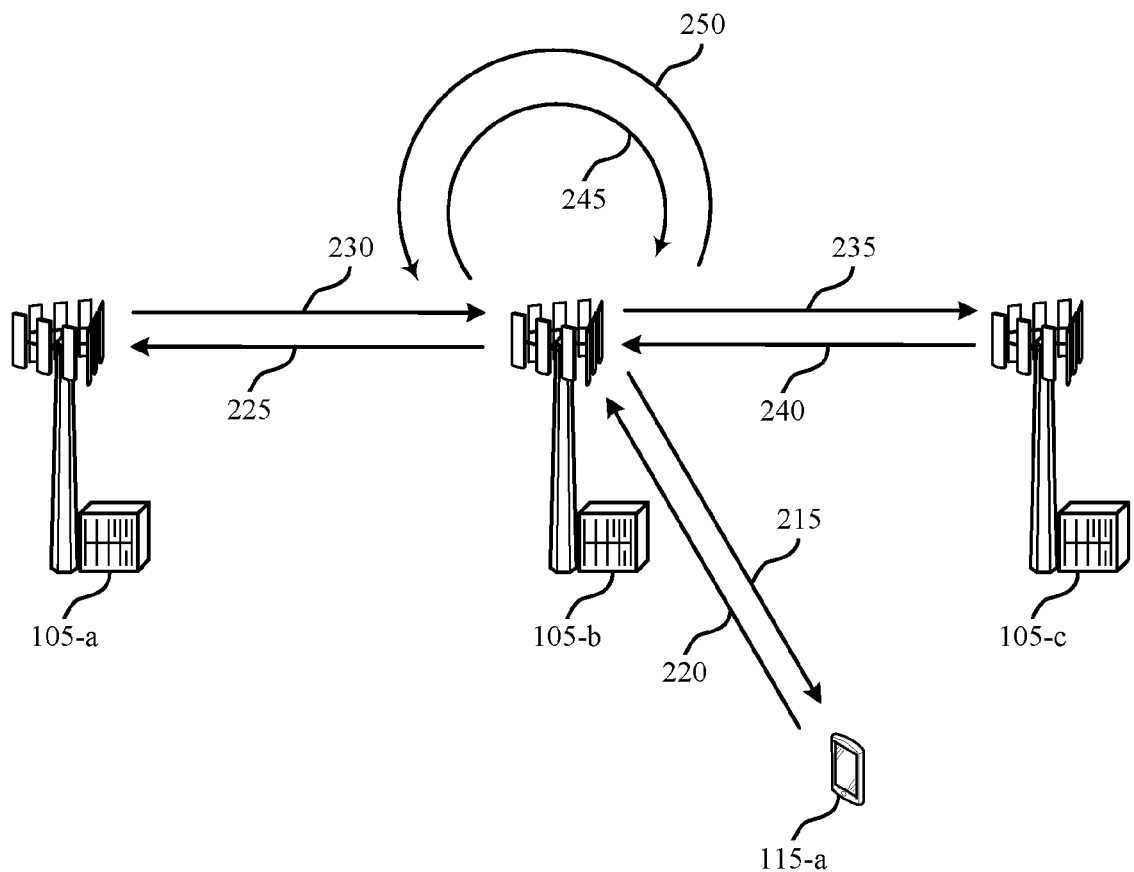
FIG. 2 illustrates an example of a wireless communications system that supports indication of synchronization signal and physical broadcasting channel block transmission beam adjustment in accordance with aspects of the present disclosure.

FIG. 2 illustrates an example of a wireless communications system 200 that supports indication of synchronization signal and physical broadcasting channel block transmission beam adjustment in accordance with aspects of the present disclosure. In some examples, wireless communications system 200 may implement aspects of wireless communications systems 100.

In some examples of a wireless communications systems, a base station 105 (e.g., base station 105-b) and a UE (e.g., UE 115-a) may synchronize communications, establish a connection, or both, using one or more SSBs. For example, base station 105-b may transmit an SSB to UE 115-a via downlink 215. The SSB may include one or more PSSs and one or more SSSs. UE 115-a may use the PSS and SSS to synchronize with base station 105-b, and communicate with base station 105-b via uplink 220. The PBCH of the SSB may include a MIB. The MIB may include basic information permitting UE 115-a to establish a connection with base station 105-b.

Having established a connection with base station 105-b, base station 105-b may send SSB transmissions using one or more transmission beams in a fixed, repeating pattern, so as to keep the SSB reception performance steady and consistent for each served UE 115, including UE 115-a. For instance, base station 105-b may transmit SSBs during a set of time intervals (e.g., SSB positions) within a time period (e.g., an SSB period). Base station 105-b may transmit SSBs on a set of transmission beams that correspond to the SSB positions of a particular SSB period. That is, base station 105-b may transmit a first SSB during a first time interval of the SSB period using a first transmission beam, a second SSB during a second time interval of the SSB period using a second transmission beam, a third SSB during a third time interval of the SSB period using a third transmission beam, etc. During a subsequent SSB period, base station 105-b may send SSBs using the same SSB transmission beam pattern. Thus, UE 115-a may perform a beam scanning procedure to measure the SSBs at each SSB position using one or more receive beams, identify a preferred transmission beam corresponding to one of the SSB positions, monitor that SSB position in subsequent SSB period using a receive beam that corresponds to a preferred transmission beam, and synchronize with the base station and/or decode the PBCH.

In some cases, base station 105-b may operate in a full-duplex mode. In such examples, base station 105-b may be an IAB node. Base station 105-b may communicate with base station 105-a (e.g., a parent node) via an uplink parent backhaul 225 and downlink parent backhaul 230. Base station 102-b may also communicate with base station 105-c (e.g., a child IAB node) via a downlink child backhaul 235 and an uplink child backhaul 240. These multiple communication paths may result in self-interference. For instance, downlink parent backhaul 230 uplink child backhaul 240, and uplink 220 may be reception links, and uplink parent backhaul 225 downlink child backhaul 235, and downlink 215 may be transmission links. For an IAB node operating in full duplex mode (e.g., base station 105-b), any transmitting signal in any transmission link potentially may cause self-interference to the received signal in any reception link. Thus, for instance, transmissions on uplink parent backhaul 225 potentially may cause interference 245 on one or more of downlink parent backhaul 230, uplink child backhaul 240, and uplink 220. Similarly, transmissions on downlink child backhaul 235 potentially may result in interference 250 on one or more of downlink parent backhaul 230, uplink child backhaul 240, and uplink 220.

In some examples, base station 105-b, when operating in full duplex mode, may generate self-interference that exceeds a threshold level (e.g., is greater than a thermal noise power) such that the self-interference impairs reception performance of corresponding channels or signals. Thus, base station 105-b may select transmission beams on which to send SSBs to UE 115-a (e.g., the SSB transmission beam pattern) based on which transmission beams experience a smallest self-interference and largest channel gain, as described in greater detail with respect to FIG. 7.

In some cases base station 105-b may change in which time interval a particular beam is used to transmit an SSB within an SSB period. For instance, the base station may change its downlink transmission beams based on detection of newly emerged obstacles, movement of one or more nodes or base stations 105, or the like. However, UE 115-b may be unaware of the change in transmission beams. Changing which transmission beam is being used to transmit an SSB during a particular SSB position may result in radio link failure due to UE 115-a being unaware that base station 105-b is using a different, second transmission beam to transmit the SSB at that SSB position. Radio link failure may occur as the receive beam of UE 115-b may be misaligned with the direction of the second transmission beam, and hence the measurement of the SSB may indicate a low signal value. When UE 115-b detects radio link failure, UE 115-b may experience latency by having to undergo beam scanning to identify another beam to reestablish a radio link with base station 105-b. To avoid such delays and decrease latency, base station 105-b may inform one or more UEs 115 (including UE 115-b) that a time interval at which a transmission beam is currently being used will be or has been changed to a new time interval within the SSB period. For example, base station 105-b may send a transmission beam adjustment message to one or more UEs 115 to indicate a change to the SSB transmission beam pattern.

Base station 105-b may send the transmission beam adjustment message to all connected UEs 115, individual UEs affected by the adjustment, or to one or more UE 115 groups, UE 115-b may receive the transmission beam adjustment message and determine the new SSB position within the SSB period that the base station is using the transmission beam to transmit the SSB, and the UE may monitor the new SSB position for the SSB using a receive beam that corresponds to the transmission beam. UE 115-b may thus monitor for the SSB at the new SSB position of an SSB period indicated in the transmission beam adjustment message without experiencing beam mismatch nor having to undergo beam scanning should radio link failure be detected due to the beam mismatch.

Figure 3:
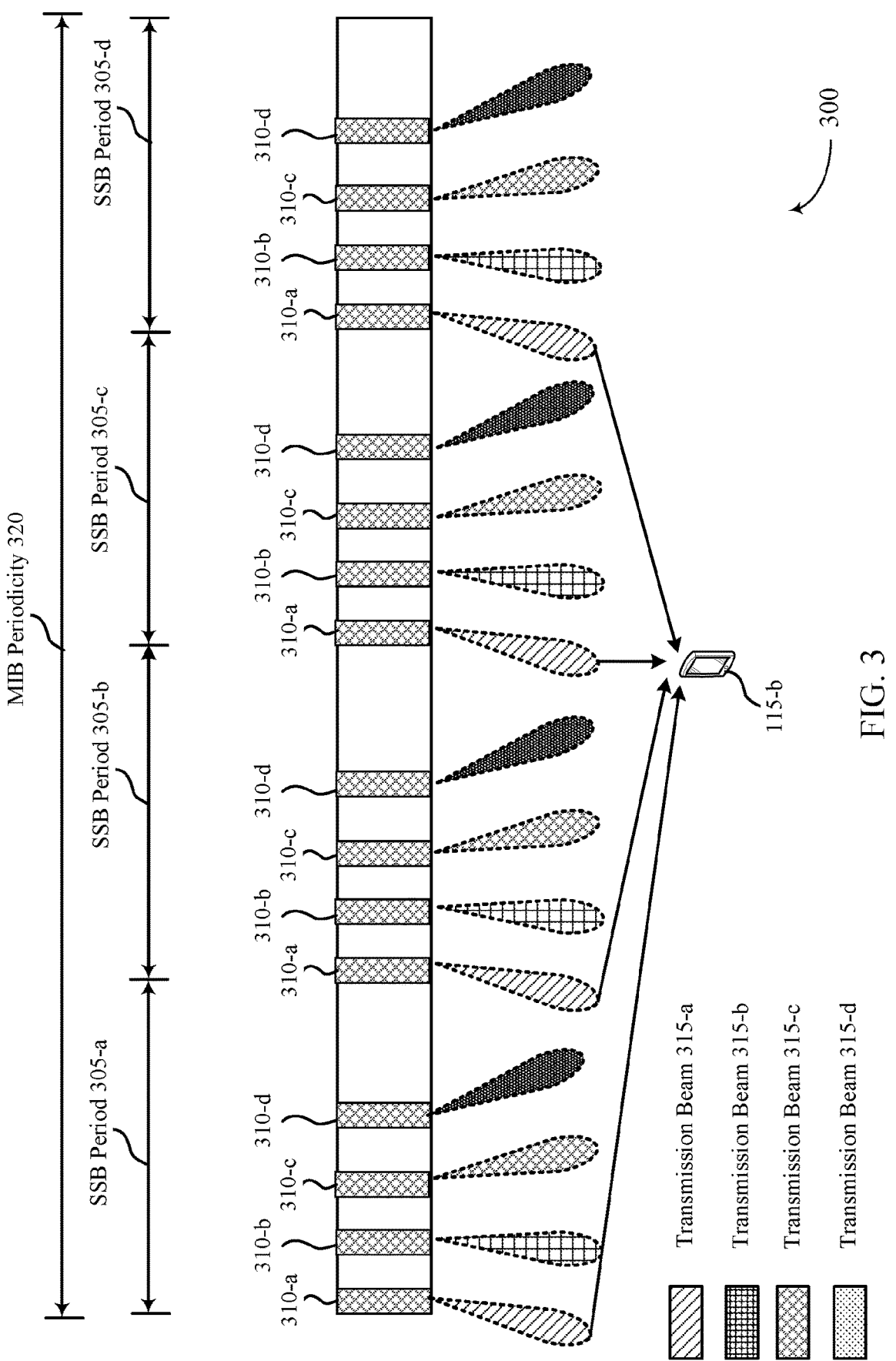
FIG. 3 illustrates an example of a timeline that supports indication of synchronization signal and physical broadcasting channel block transmission beam adjustment in accordance with aspects of the present disclosure.

FIG. 3 illustrates an example of a timeline 300 that supports indication of synchronization signal and physical broadcasting channel block transmission beam adjustment in accordance with aspects of the present disclosure. In some examples, timeline 300 may implement aspects of wireless communications system 100.

In some examples, a base station 105 may transmit one or more SSBs to a UE 115-b. Each SSB (e.g., synchronization signal and PBCH block) may include a PSS and an SSS. Each SSB may occupy a number of transmission time intervals (e.g., one OFDM symbol) and a number of frequency resources (e.g., 127 subcarriers). Each PBCH of the SSB may span a number of TTIs (e.g., 3 OFDM symbols) and a number of frequency resources (e.g., 240 subcarriers). The PBCH may include a MIB, which may be transmitted according to MIB periodicity 320 (e.g., 80 ms). During each MIB periodicity 320, base station 105 may transmit PBCHs having the same MIB content repeatedly at a number of positions (e.g., SSB position 310). MIB periodicity 320 may be divided into SSB periods 305. Each SSB position may be a time interval in which the base station 105-a transmits an SSB using a respective transmission beam. Each SSB period 305 may have a uniform duration in time (e.g., 5 ms, 10 ms, 20 ms, 40 ms, 80 ms, etc.). Within an SSB period 305, base station 105 may send an SSB during a set of SSB positions 310. The number of SSB positions 310 and a first symbol of each SSB position 310 may be dependent on the subcarrier spacing (SCS) and carrier frequency corresponding to the SSB period 305. Each SSB period 305 may include a same number of SSB positions 310 (e.g., between 4 and 64 SSB positions 310).

In some examples, base station 105 may be equipped with multiple antennas, and may transmit an SSB during each SSB position 310 using a different transmission beam 315 to extend coverage to a larger geographic area to seamlessly cover an entire cell. For example, during SSB period 305-a, base station 105 may transmit an SSB during SSB position 310-a over transmission beam 315-a, base station 105 may transmit the SSB during SSB position 310-b over transmission beam 315-b, base station 105 may transmit the SSB during SSB position 310-c over transmission beam 315-c, and base station 105 may transmit the SSB during SSB position 310-d over transmission beam 315-d. The fixed and repetitive order of transmission beams 315 used for transmitting the SSBs at the respective SSB positions within each SSB period 305 may be referred to as an SSB transmission beam pattern. During subsequent SSB periods 305 (e.g., SSB period 305-b, SSB period 305-c, SSB period 305-d, etc.), base station 105 may transmit SSBs during SSB periods 305 using the same SSB transmission beam pattern.

UE 115 may determine a best transmit/receive beam (e.g., a best receive beam on which to receive transmission send on a particular transmission beam 315) by scanning multiple SSB positions 310 within an SSB period 305 to acquire a preferred transmission beam 315. For each SSB position 310 within an SSB period 305, UE 115-b may combine multiple received samples in the same SSB position 310 across multiple SSB periods 305 because the received samples are sent via the same transmission beams 315. For instance, UE 115-b may perform a beam-sweeping procedure, and identify a receive beam corresponding to transmission beam 315-a as a preferred receive beam. UE 115-b may then monitor SSB position 310-a during each of SSB period 305-a, SSB period 305-b, SSB period 305-c, and SSB period 305-d. UE 115-b may generate, based on the monitoring, multiple samples of SSB received at SSB position 310-a from base station 105 via transmission beam 315-a, and may combine the received samples to synchronize with base station 105 based thereon, to decode the PBCH of the SSB, or both.

Figure 8:
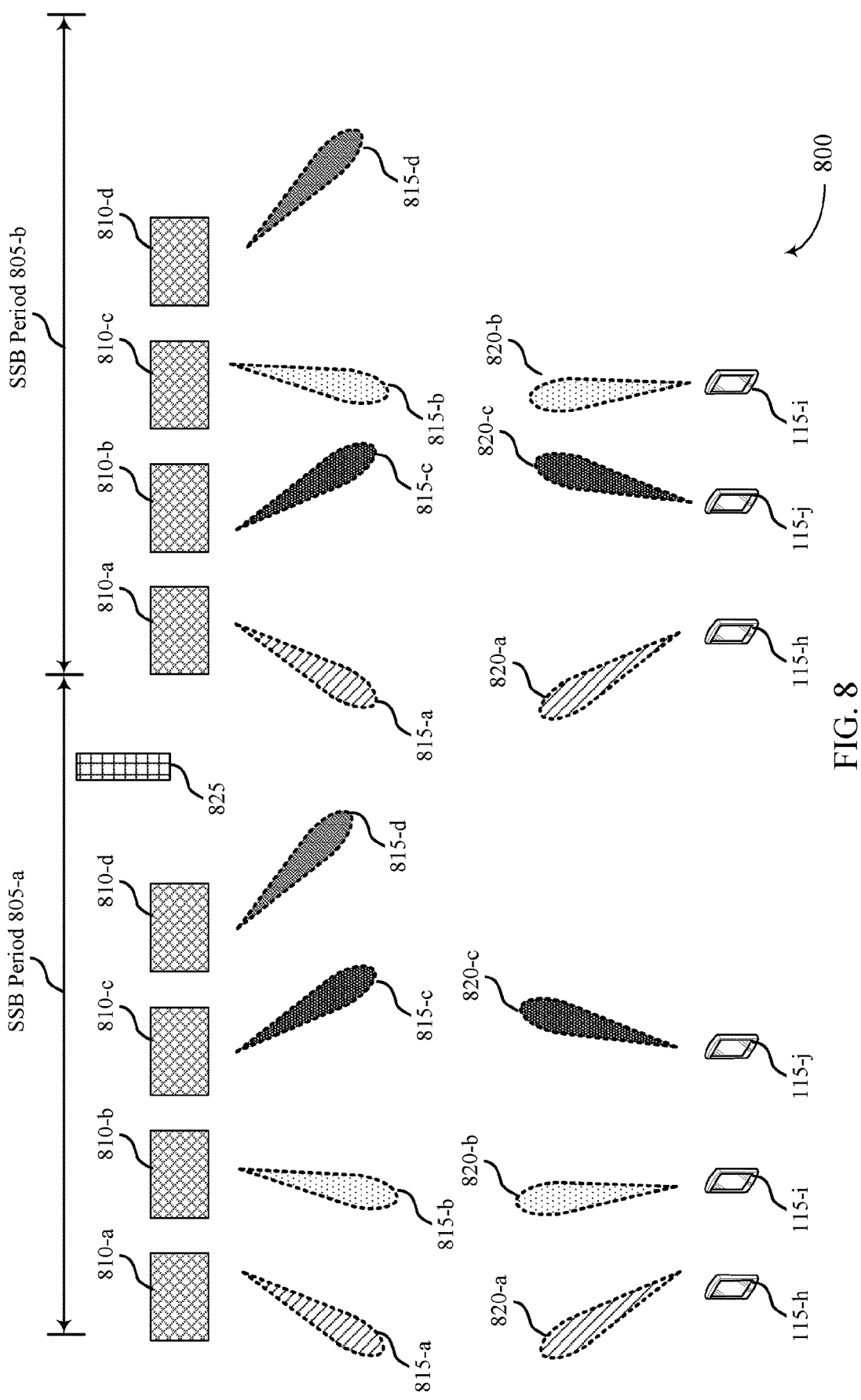
FIG. 8 illustrates an example of a timeline that supports indication of synchronization signal and physical broadcasting channel block transmission beam adjustment in accordance with aspects of the present disclosure.
Figure 9:
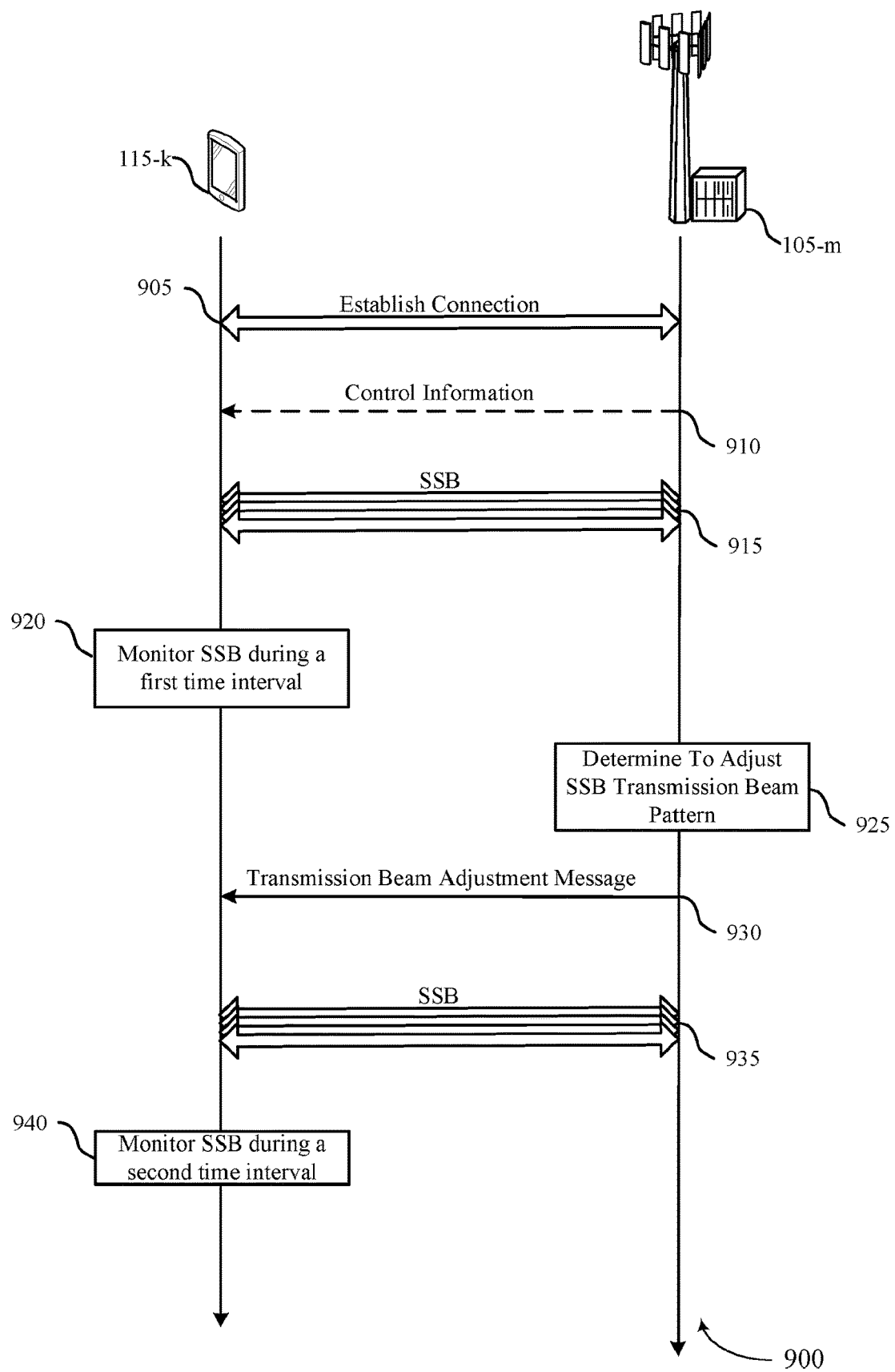
FIG. 9 illustrates an example of a process flow that supports indication of synchronization signal and physical broadcasting channel block transmission beam adjustment in accordance with aspects of the present disclosure.

In some cases, as described in greater detail with respect to FIG. 8 and FIG. 9, base station 105 may change the SSB transmission beam pattern. However, if a UE 115-b is unaware of the change, it may continue to monitor for an SSB during an erroneous SSB position 310 which no longer corresponds to the preferred transmission beam. Instead, base station 105 may send an indication of the adjusted SSB transmission beam pattern, to avoid link failure and increased system latency.

Figure 4:
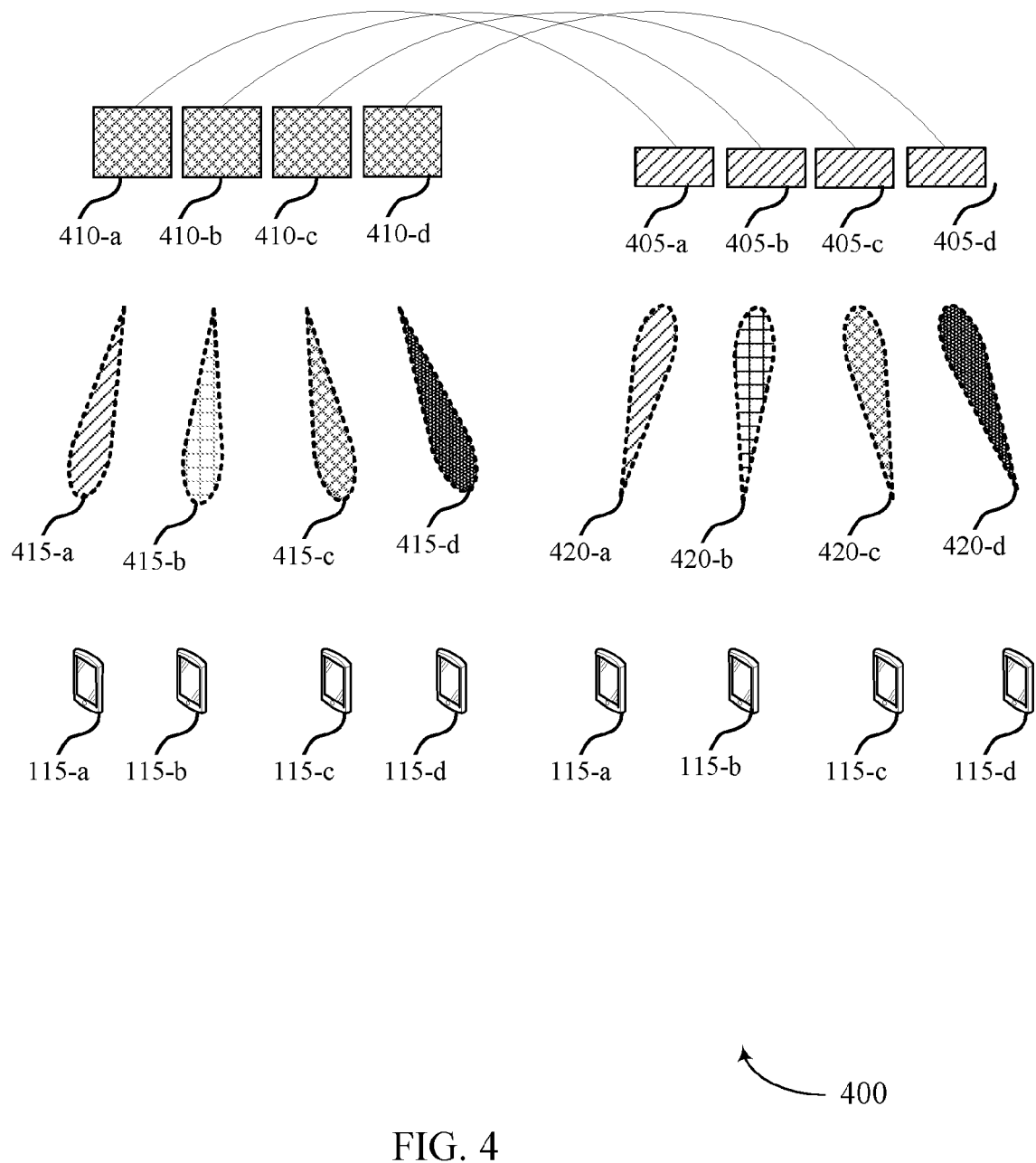
FIG. 4 illustrates an example of a resource allocation that supports indication of synchronization signal and physical broadcasting channel block transmission beam adjustment in accordance with aspects of the present disclosure.

FIG. 4 illustrates an example of a resource allocation 400 that supports indication of synchronization signal and physical broadcasting channel block transmission beam adjustment in accordance with aspects of the present disclosure. In some examples, resource allocation 400 may implement aspects of wireless communications system 100.

In some examples, an SSB period may include four SSB positions 410 (e.g., SSB position 410-a, SSB position 410-b, SSB position 410-c, and SSB position 410-d) within an SSB period. The base station 105-a may use a different transmission beam 415 of an SSB transmission beam pattern at each SSB position 410 to transmit a same SSB. For instance, the base station 105-a may use transmission beam 415-a to transmit an SSB at SSB position 410-a, transmission beam 415-b to transmit an SSB at SSB position 410-b, transmission beam 415-c to transmit an SSB at SSB position 410-c, and transmission beam 415-d to transmit an SSB at SSB position 410-d. Different UEs 115 may select preferred transmission beams 415 to monitor with a corresponding receive beam (e.g., may receive SSBs from base station 105 using a receive beam that corresponds to a transmission beam 415) based on a signal quality and/or strength of the received SSB using the respective receive beam. That is, UE 115-a may select to monitor an SSB transmitted using transmission beam 415-a, UE 115-b may select to monitor an SSB transmitted using transmission beam 415-b, UE 115-c may select to monitor an SSB transmitted using transmission beam 415-c, and UE 115-d may select to monitor an SSB transmitted using transmission beam 415-d. For data transfer, a base station 105 may indicate (e.g., using a beam index) a transmission beam on which data will be transmitted, and the receiving UE 115 may select a corresponding receive beam on which to receive the data.

In some examples, SSB positions 410 may be linked to (e.g., may correspond to) at least one physical random access channel (PRACH) resource 405. When a UE 115 identifies a preferred SSB position 410 within an SSB period, the UE 115 may send a first random access message (e.g., a random access preamble) of a two-step or four-step random access procedure in the PRACH resource 405 that corresponds with the selected SSB position 410. For instance, UE 115-a may transmit a random access message on PRACH resource 405-a using uplink transmission beam 420-a that corresponds to SSB position 410-a for an SSB transmitted using transmission beam 415-a, UE 115-b may transmit a random access message on PRACH resource 405-b using uplink transmission beam 420-b that corresponds to SSB position 410-b for an SSB transmitted using transmission beam 415-b, UE 115-c may transmit a random access message on PRACH resource 405-c using uplink transmission beam 420-c that corresponds to SSB position 410-c for an SSB transmitted using transmission beam 415-c, and UE 115-d may transmit a random access message on PRACH resource 405-d using uplink transmission beam 420-d that corresponds to SSB position 410-d for an SSB transmitted using transmission beam 415-d.

A base station 105 receiving the random access message in a particular PRACH resource 405 may determine the preferred transmission beam 415 for the UE 115. For instance, UE 115-a may select a preferred transmission beam 415-a. UE 115-a may receive an SSB during SSB position 410-a transmitted using transmission beam 415-a. To initiate a random access procedure, UE 115-a may send a random access message using PRACH resource 405-a on uplink transmission beam 420-a. Upon receiving the random access message on PRACH resource 405-a, base station 105 may determine that PRACH resource 405-a corresponds to SSB position 410-a, which corresponds to transmission beam 415-a. For subsequent downlink transmissions for a specific UE 115-a (e.g., a transmission beam adjustment message), base station 105 may select transmission beam 415-a. When a base station 105 determines to send a UE-specific transmission beam adjustment message to a UE 115, as described in greater detail with respect to FIGS. 8 and 9, the base station 105 may determine a transmission beam 415 based on the correlation between the SSB positions 410 and MACH resources 405.

Figure 5:
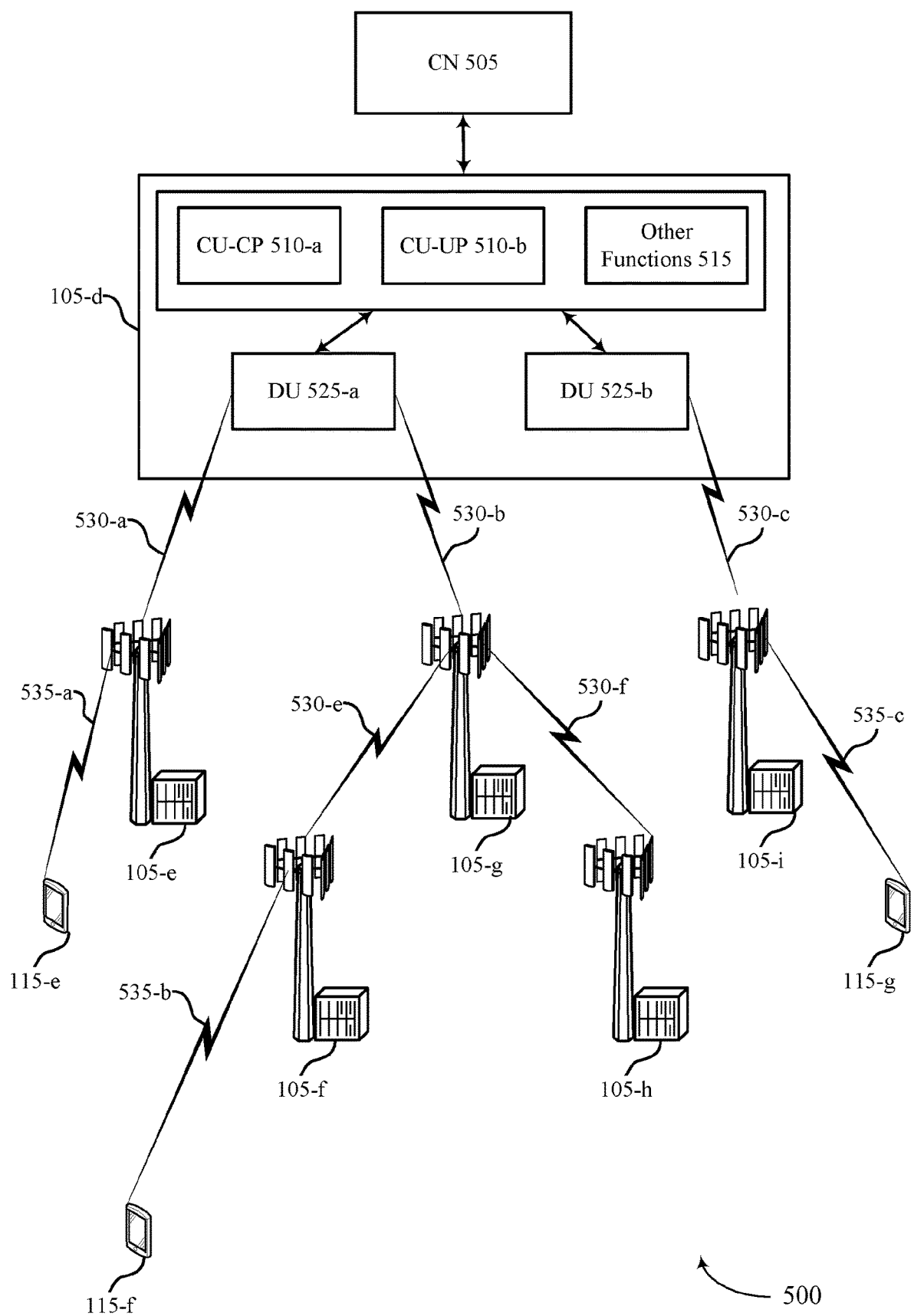
FIG. 5 illustrates an example of a wireless communications system that supports indication of synchronization signal and physical broadcasting channel block transmission beam adjustment in accordance with aspects of the present disclosure.

FIG. 5 illustrates an example of a wireless communications system 500 that supports indication of synchronization signal and physical broadcasting channel block transmission beam adjustment in accordance with aspects of the present disclosure. In some examples, wireless communications system 500 may implement aspects of wireless communications system 100.

In some examples of wireless communications systems (e.g., a 5G system), one or more base stations 105 may operate in a full duplex mode. Full duplex mode may provide ultra-high data rates and support a wide scope of application scenarios. Full duplex communications may be capable of increasing (e.g., doubling) a link capacity. Full duplex mode may enable a radio network node to transmit and receive simultaneously during the same TTI (e.g., slot). Full duplex may operate in contrast with half-duplex modes where transmission and reception of signals occur during different TTIs. A full duplex capable network node (e.g., a base station 105) in a cellular network may communicate simultaneously in uplink and downlink with two half-duplex terminals using the same radio resources. In some wireless full duplex application scenarios, one relay node may communicate simultaneously with an anchor node and one or more UEs 115 in a one-hop scenario, or with other two relay nodes in a multi-hope scenario. In some examples, by doubling each single-link capacity, full duplex mode may significantly increase system throughput in diverse applications in wireless communication networks, and may reduce transfer latency for time critical services.

An IAB system may include at least on IAB donor base station 105-*d*, one or more IAB nodes (e.g., base stations 105), and one or more UEs UE 115-*f* and UE 115-*g*). In some examples, multiple IAB nodes may be connected inline to improve coverage. In such examples, for a given IAB node, another IAB node that is closer to the IAB donor node may be referred to as a parent node or a parent base station 105, and a connected IAB node that is further from the IAB donor node may be referred to as a child node or child base station 105.

For example, donor base station 105-*d* may be in communication with core network 505. Donor base station 105-*d* may include a central unit control plane (CU-CP) 505-*a* and a CU-CP 510-*b*, and one or more modules for other functions 515. The CU-CPs 510 and the other functions 515 may be in communication with a distribution unit (DU) 525-*a* and DU 525-*b*. Donor base station 105-*d* may communicate with one or more IAB nodes (e.g., base stations 105) via DUs 525. For instance. DU 525-*a* may be in communication with base station 105-*e* via wireless backhaul link 530-*a*. Base station 105-*e* may communicate with UE 115-*e* via a wireless access link 535-*a*. Similarly, DU 525-*a* may communicate with base stations 105-*g* via wireless backhaul link 530-*a*, base station 105-*g* may communicate with base stations 105-*h* and base station 105-*f* via wireless backhaul link 530-*e*, respectively, and base station 105-*f* may communicate with UE 115-*f* via wireless access link 535-*b*. In such examples, base station 105-*g* (e.g., an IAB node) may be a parent node to base station 105-*f*. In some examples, base station 105-*f* may be a child node to base station 105-*g*. DU 525-*b* may communicate with base station 105-*i* via wireless backhaul link 530-*c*, and base station 105-*i* may communicate with UE 115-*g* via wireless access link 535-*c*.

In some examples, a base station 105 operating in full duplex mode (e.g., base station 105-*d*) may generate self-interference, as described in greater detail with respect to FIG. 2. A particular IAB node (e.g., a base station 105) operating in full duplex mode may communicate via six types of links (e.g., a downlink parent backhaul link 530, an uplink parent backhaul link 530 with a parent base station 105, a downlink child backhaul link 530 and an uplink child backhaul link 530 with a child base station 105, and an uplink access link 535 and downlink access link 535 with one or more UEs 115. Downlink parent backhaul link 530, uplink child backhaul link 530, and uplink access link 535 may be referred to as reception links. Uplink parent backhaul link 530, downlink child backhaul link 530, and downlink access link 535 may be referred to as transmission links. For an IAB node in full duplex mode, any signal transmitted on any transmission link may cause self-interference to a received signal in any reception link. If self-interference is sufficiently strong (e.g., is larger than a thermo noise power threshold) then self-interference may impair the reception performance of a corresponding channel or signal.

To enable full duplex transmissions, a base station 105 may cancel self-interference from downlink to uplink. Some examples of full duplex radio designs may suppress up to 110 dB or more of self-interference by using beamforming techniques, analog cancellation, digital cancellation, antenna cancellation, and the like. If transmit power for a base station 105 is large, then some remaining self-interference may occur even after cancellation. Such self-interference may impair reception performance of received signals. In some examples, as described in greater detail with respect to FIG. 6, a base station may select one or more SSB transmission beams to avoid or decrease the impact of self-interference.

Figure 6:
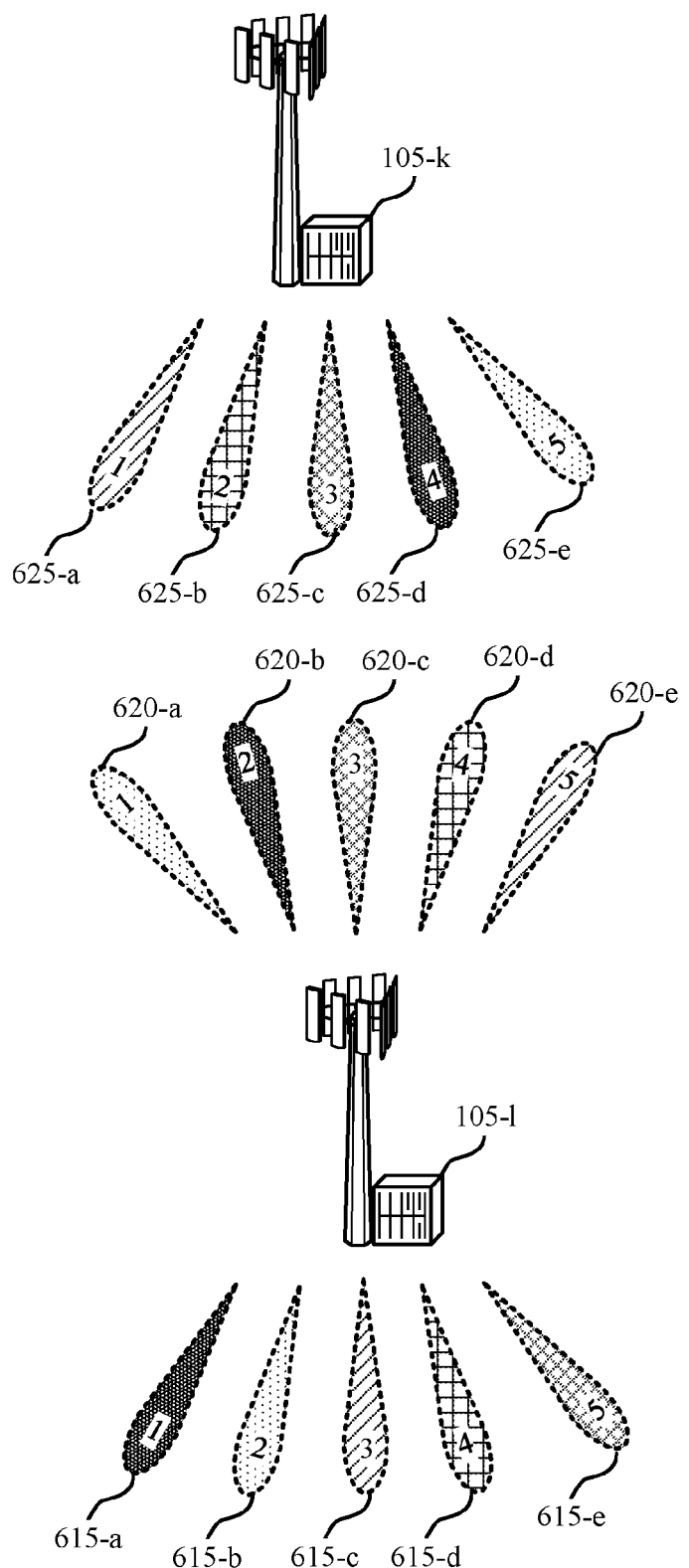
FIG. 6 illustrates an example of a wireless communications system that supports indication of synchronization signal and physical broadcasting channel block transmission beam adjustment in accordance with aspects of the present disclosure.

FIG. 6 illustrates an example of a wireless communications system 600 that supports indication of synchronization signal and physical broadcasting channel block transmission beam adjustment in accordance with aspects of the present disclosure. In some examples, wireless communications system 600 may implement aspects of wireless communications system 100.

In an IAB system, parent beams and child beams may be related. For instance, base station 105-*l* and base station 105-*k* may be IAB nodes in full duplex mode. Each transmission beam 615 in a child link for base station 105-*l* may have a corresponding preferred-matched (e.g., best-matched) receive beam 620 in a parent link with base station 105-*k*. Having a preferred-matched may means that a self-interference criterion is satisfied (e.g., the smallest self-interference), a channel gain criterion is satisfied (e.g., largest channel gain), or both. In the depicted example, child link transmission beams 615-*a*, 615-*b*, 615-*c*, 615-*d*, and 615-*e* may be matched (e.g., best-matched) with parent link receive beams 620-*b*, 620-*a*, 620-*e*, 620-*d*, and 620-*c*, respectively.

When parent base station 105-*k* uses a transmission beam 625 in a parent link with base station 105-*l*, base station 105-*l* may have a preferred receive beam 620 in the parent link. In an example, the preferred-matched receive beams 620 for transmission beams 625 may be beams having the largest channel gain. In the depicted example, parent transmission beams 625-*a*, 625-*b*, 625-*c*, 625-*d*, and 625-*e*, may be matched (e.g., best-matched) with receive beams 620-*e*, 620-*d*, 620-*c*, 620-*b*, and 620-*a*, respectively.

When parent base station 105-*k* uses a transmission beam 625 in a parent link with base station 105-*l*, base station 105-*l* may have a preferred-matched transmission beam 615 in a child link. In an example, the preferred-matched transmission beam 615 corresponding to a transmission beam 625 in the parent link may be a transmission beam 615 having the smallest self-interference and the largest channel gain. In the depicted example, transmission beams 625-*d*, 625-*e*, 625-*a*, 625-*b*, and 625-*c* for base station 105-*k* may be matched (e.g., best-matched) with transmission beams 615-*a*, 615-*b*, 615*c*, 615-*d*, and 615-*e*, respectively.

Figure 7:
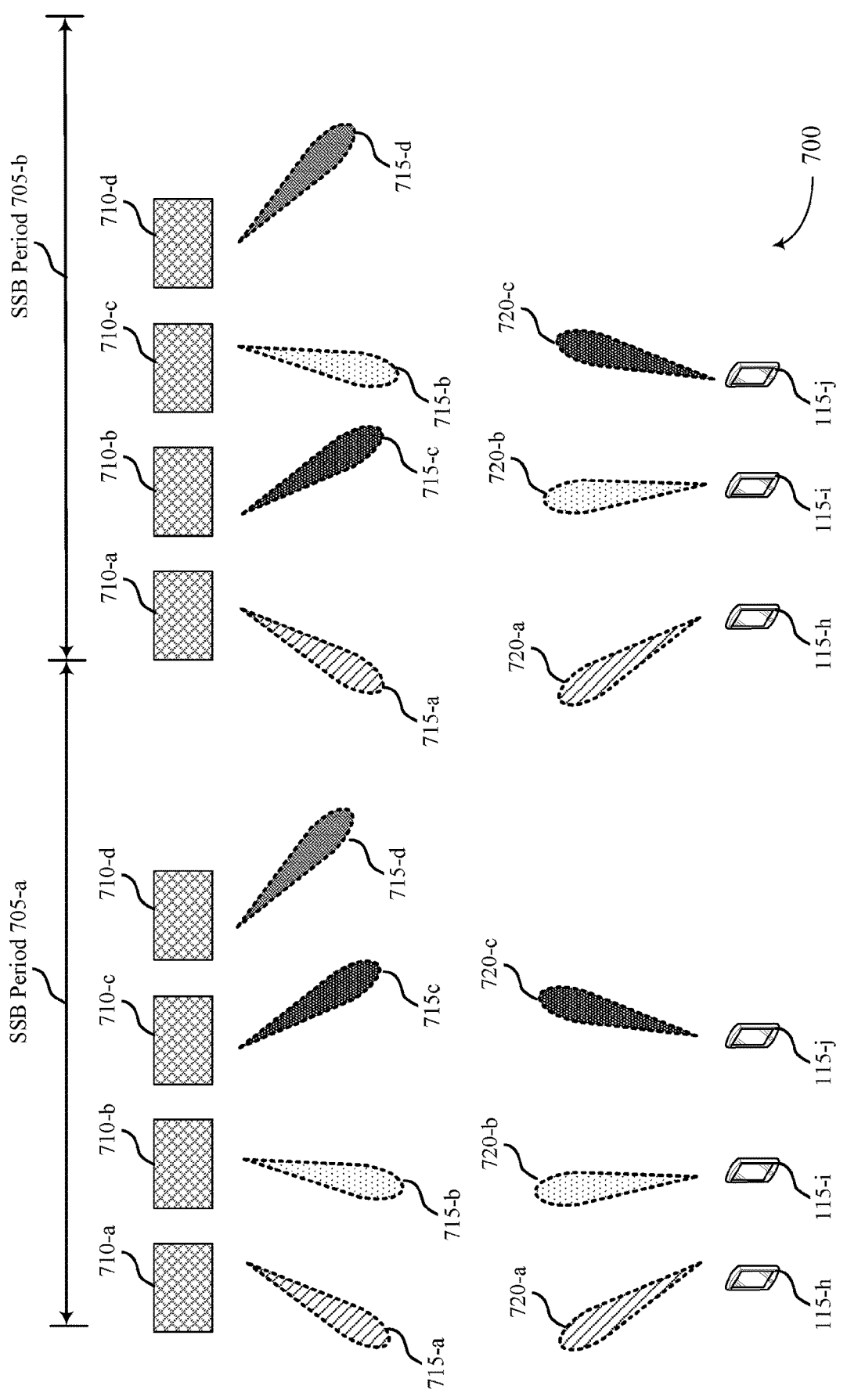
FIG. 7 illustrates an example of a timeline that supports indication of synchronization signal and physical broadcasting channel block transmission beam adjustment in accordance with aspects of the present disclosure.

In some examples, however, something may occur (e.g., a new obstacle between base station 105-*k* and base station 105-*l* a shift in location or antenna array for base station 105-*k* and base station 105-*l* or the like), which may change the preferred transmission beam 625 for base station 105-*k*. In such examples, base station 105-1 may determine that a change in transmission beams 615 may be beneficial (e.g., a new transmission beam 625 may impact gain and interference on transmission beams 615) based on the occurrence. Base station 105-*k* may change one or more transmission beams 615, including transmission beams 615 for SSB transmissions during respective SSB positions of an SSB period. However, a UE 115 may be unaware of the transmission beam change for one or more SSB positions within an SSB period, as described in greater detail with respect to FIG. 7, FIG. 7 illustrates an example of a timeline 700 that supports indication of synchronization signal and physical broadcasting channel block transmission beam adjustment in accordance with aspects of the present disclosure. In some examples, timeline 700 may implement aspects of wireless communications system 100.

In some examples, a base station 105 may adjust one or more SSB transmission beams 715 of an SSB transmission beam pattern to account for changes to self-interference and/or channel gain. For example, during a first SSB period 705-a, base station 105 may transmit an SSB during SSB position 710-a over transmission beam 715-a, SSB position 710-b over transmission beam 715-b, SSB position 710-c over transmission beam 715-c, and SSB position 710-d over transmission beam 715-d. UE 115-b may select to monitor for at SSB transmitted using transmission beam 715-a as a preferred transmission beam, and may receive the SSB during SSB position 710-a using a receive beam 720-a that corresponds to the transmission beam 715-a (e.g., UE 115-h measures a highest signal metric for SSB transmitted with transmission beam 715-a using receive beam 720-a). Similarly, UE 115-i may receive the SSB during SSB position 710-b via receive beam 720-b which corresponds to transmission beam 715-b, and UE 115-j may receive the SSB during SSB position 710-c via receive beam 720-c which corresponds to transmission beam 715-c.

As described with respect to FIG. 6, base station 105 may change one or more transmission beams 715 of an SSB transmission beam pattern from one SSB period 705 to the next SSB period. For example, in an IAB system where a parent link for a base station 105 and a child link for the base station 105 use the same time-frequency position for SSB transmissions, when a parent link of base station 105 is broken (e.g., signal propagation is blocked by a newly emerged obstacle, or an antenna panel direction is changed du to IAB node movement), then best-matched receive beams in the parent link for one or more corresponding transmission beams may be changed. In such examples, because of the beam matching relationship of parent link and child link discussed in greater detail with respect to FIG. 6, a change in receive beams on a parent link may result in a change to the SSB transmission beam pattern in the child link. That is, a transmission beam for some SSB positions 710 may be adjusted.

When adjusting an SSB transmission beam pattern, base station 105 may change the order of transmission beams 715 of an SSB transmission beam pattern for a subsequent SSB period 705, remove one or more transmission beams 715, add one or more transmission beams 715, or any combination thereof. For example, between SSB period 705-a and SSB period 705-b, base station 105 may change the order of transmission beam 715-b and transmission beam 715-c. Thus, during SSB period 705-b, base station 105 may transmit an SSB during SSB position 710-a via transmission beam 715-a, but may transmit the SSB during SSB position 710-b using transmission beam 715-c and may transmit the SSB during SSB period 710-c using transmission beam 715-b.

In conventional systems, UEs 115 are not notified of adjustments to the SSB transmission beam pattern. If a UE 115 is not notified of the adjustment to the SSB transmission beam pattern, then the UE 115 may attempt to read an SSB at a particular SSB position 710 using a particular receive beam 720 based on the previous unaltered SSB transmission beam pattern, and may be unable to do so or at a degraded level. That is, a UE 115 may be expecting to receive an SSB during a particular SSB position 710 on a preferred receive beam 720 corresponding to a preferred transmission beam 715, according to a previously established SSB transmission beam pattern. If an SSB is transmitted during an SSB position 710 using a different transmission beam 715 (according to the adjusted. SSB transmission beam pattern), then the UE 115 may fail to decode the SSB, and may initiate beam-sweeping procedures to find a new beam. For instance, UE 115-h may receive the SSB during SSB position 710-a using receive beam 720-a. Because receive beam 720-a corresponds to transmission beam 715-a. UE 115-b may successfully receive and decode the SSB. However, UE 115-i may attempt to receive the SSB during SSB position 710-b using receive beam 720-b. Because receive beam 720-b corresponds to transmission beam 715-b, and because base station 105 has transmitted the SSB during SSB position 710-b using transmission beam 715-c due to the adjusted SSB transmission beam pattern, UE 115-i may fail to receive the SSB. Similarly, UE 115-j may fail to receive the SSB during SSB position 710-c because receive beam 720-c does not correspond to transmission beam 715-b (e.g., the transmission and receive beams are misaligned). In such examples, UE 115-i and UE 115-j may determine that links via transmission beam 715-b and transmission beam 715-c, respectively, have failed. UE 115-i and UE 115-j may initiate beam-sweeping or beam refinement procedures to identify a new preferred transmission beam, a new SSB position 710 on which to monitor for SSBs, or both.

As described herein, if a UE 115 is unaware of an adjustment to the SSB transmission beam pattern, then the UE 115 may experience delays and latency. That is, if an SSB transmission beam pattern within an SSB period 705 changes, then the meaning of an SSB-based quasi-co-located (QCL) indication for the SSB position indexes may also be changed. Using an obsolete QCL scheme may result in data transfer failure. That is, prior to adjusting the SSB transmission beam pattern (e.g., during SSB period 705-a) base station 105 may indicate SSB position 710-b to UE 115-i as the transmission beam 715-b used for physical downlink shared channel (PDSCH) data transfer. Transmission beam 715-b may then be used during SSB position 710-b and UE 115-i may use receive beam 720-b for successful reception of data. However, after base station 105 changes the SSB transmission beam pattern (e.g., during SSB period 705-b), base station 105 may use transmission beam 715-c during SSB period 710-b. If UE 115-i continues to monitor using receive beam 720-b, then UE 115-i may experience reception failure. Similarly, UE 115-j may experience reception failure during SSB position 710-c of SSB period 705-b. Upon detecting SSB transmission beam adjustments (e.g., via reception failure), a UE 115 may reacquire an optimal or preferred SSB reception position that may achieve improved beamforming gain and a better receive beam 720 match with a transmission beam 715. Until UE 115 is able to acquire a new SSB position 710 and receive beam 720, UE 115 may be unable to receive SSBs, or other signals from base station 105, resulting in data transfer interruption, connection loss, or the like.

To avoid the increased latency due to requiring SSB position 710 and receive beam 720, a base station 105 may indicate to a UE 115 when an adjustment to the SSB transmission beam pattern will occur. In such examples, the UE 115 may monitor for SSBs during SSB positions 710 that correspond to preferred receive beams 720, as described in greater detail with respect to FIG. 8.

FIG. 8 illustrates an example of a timeline 800 that supports indication of synchronization signal and physical broadcasting channel block transmission beam adjustment in accordance with aspects of the present disclosure. In some examples, timeline 800 may implement aspects of wireless communications system 100.

In some examples, a base station 105 may transmit a transmission beam adjustment message indicating a change to the SSB transmission beam pattern in an upcoming SSB period. The transmission beam adjustment message may indicate that some or all SSB positions 810 are changed for one or more subsequent SSB periods 805.

In some examples, a base station 105 may adjust one or more SSB transmission beams 815 of an SSB transmission beam pattern. For example, during a first SSB period 805-*a*, base station 105 may transmit SSBs during SSB position 810-*a* over transmission beam 815-*a*, SSB position 810-*b* over transmission beam 815-*b*, SSB position 810-*c* over transmission beam 815-*c*, and SSB position 810-*d* over transmission beam 815-*d*. UE 115-*b* may select transmission beam 815-*a* as a preferred transmission beam, and may receive the SSB during SSB position 810-*a* using corresponding receive beam 820-*a*. Similarly, UE 115-*i* may receive the SSB during SSB position 810-*b* via receive beam 820-*b* which corresponds to transmission beam 815-*b*, and UE 115-*j* may receive the SSB during SSB position 810-*c* via receive beam 820-*c* which corresponds to transmission beam 815-*c*. Between SSB period 805-*a* and SSB period 805-*b*, base station 105 may change the SSB transmission beam pattern. During SSB period 805-*h*, base station 105 may transmit an SSB during SSB position 810-*a* via transmission beam 815-*a*, but may transmit the SSB during SSB position 810-*b* using transmission beam 815-*c* and may transmit the SSB during SSB position 810-*c* using transmission beam 815-*b*.

In some examples, base station 105 may send (e.g., via PDCCH) a transmission beam adjustment message 825 to UE 115. The transmission beam adjustment message 825 may notify UE 115 of a change from an old SSB transmission beam pattern to a new SSB transmission beam pattern. Upon receiving transmission beam adjustment message 825, a UE 115 may receive SSBs based on the new SSB transmission beam pattern. For instance, upon receiving transmission beam adjustment message 825, UE 115-*b* may determine that base station 105 will still transmit the SSB during SSB position 810-*a* using transmission beam 815-*a*. Thus, UE 115-*b* may receive the SSB using receive beam 820-*a*. UE 115-*i* may determine, based on transmission beam adjustment message 825, that base station 105 will now transmit the SSB during SSB position 810-*b* using transmission beam 815-*c* instead of transmission beam 815-*b*, and the SSB during SSB position 810-*c* using transmission beam 815-*h* instead of transmission beam 815-*c*. Thus, UE 115-*i* may monitor for the SSB using receive beam 820-*h* during SSB position 810-*c* instead of during SSB position 810-*b*. Similarly, UE 115-*j* may determine, based on the transmission beam adjustment message 825, that base station 105 will transmit the SSB during SSB position 810-*b* using transmission beam 815-*c*. Thus, UE 115-*j* may monitor for the SSB using receive beam 820-*c* during SSB position 810-*b*, instead of during SSB position 810-*c*.

In some examples, base station 105 may send the transmission beam adjustment message 825 to all connected UEs 115. In such examples, transmission beam adjustment message 825 may include an indication of an adjustment to the whole SSB transmission beam pattern. That is, transmission beam adjustment message 825 may include an indication of which SSB position 810 each transmission beam of the SSB transmission beam pattern will be used. For instance, transmission beam adjustment message 825 may indicate an array of indexes (e.g., [1, 3, 2, 4]). The array of indexes may indicate that a set of transmission beams 815 of a current (e.g., adjusted) SSB transmission beam pattern (e.g., in positions [1, 2, 3, 4]) were previously transmitted (e.g., according to the adjusted SSB transmit pattern in a previous SSB period 805) according to the indicated array of indexes (e.g., [1, 3, 2, 4]. Thus, the array indexes [1, 3, 2, 4] included in transmission beam adjustment message 825 may indicate that the transmission beam 815-*b* which is currently being used during SSB position 810-*c* of SSB period 805-*h* was previously used during SSB position 810-*b*.

In some examples, transmission beam adjustment message 825 may include an indication of one or more new beams. Base station 105 may indicate new beams with a fixed value (e.g., 0) at the SSB position 810 of the array of indexes. Thus, if base station 105 indicates, in the transmission beam adjustment message 825, an array of indexes [0, 3, 2, 4] (not shown), then UE 115 may determine that a new transmission beam 815 beam is being used during SSB position 810-*a*, the transmission beam 815-*c* previously used during SSB position 810-*c* is now being used during SSB position 810-*b*, the transmission beam 815-*b* previously used during SSB position 810-*b* is now being used during SSB position 810-*c*, and that the transmission beam 815-*d* will still be used during SSB position 810-*d*. A transmission beam adjustment message 825 may be or may be included in a group-common downlink control information (DCI) addressed to a common radio network temporary identifier (RNTI) received by all connected UEs 115. The transmission beam adjustment message 825 may include an indication that one or more transmission beams 815 that have been previously used will continue to be used, or that one or more new transmission beams 815 have been added to the SSB transmission beam pattern, or that one or more of the transmission beams 815 that have been previously used will not be used any longer after receiving transmission beam adjustment message 825.

In some examples, base station 105 may determine which SSB position 810 various UEs 115 are using to receive the SSB, and may send the transmission beam adjustment message 825 to each of the identified UEs (e.g., individually send transmission beam adjustment message 825 to only the UEs impacted by the change). For instance, base station 105 may receive random access messages from one or more UEs 115 (as described in greater detail with respect to FIG. 4). In such examples, base station 105 may determine which SSB position the transmitting UE 115 is using to receive the SSB. Based on this determination, base station 105 may send an individual transmission beam adjustment message 825 to the identified UE 115 (e.g., and may skip transmitting transmission beam adjustment message 825 to one or more other UEs). In such examples, transmission beam adjustment message 825 may include an indication of the new SSB position 810 for the transmission beam 815. UE 115 may receive transmission beam adjustment message 825, and may change the SSB position 810 during which it monitors using a preferred receive beam 820. For instance, UE 115-*j* may monitor for the SSB during SSB position 810-*c* of SSB period 805-*a*. Transmission beam adjustment message 825 may indicate that the new SSB position 810 for transmission beam 815-*c* will be SSB position 810-*b*, beginning during SSB period 805-*b*. UE 115-*j* may thus monitor for the SSB using receive beam 820-*c* during SSB position 810-*b* instead of during SSB position 810-*c*. Individual transmission beam adjustment message 825 for specific UEs 115 may be send via a dedicated radio resource control (RRC) message, a dedicated media access control control element (MAC-CE), dedicated DCI, or the like.

In some examples, base station 105 may send transmission beam adjustment message 825 to each UE group having a common SSB transmission beam that has been changed. In such examples, transmission beam adjustment message 825 may indicate to a UE group that uses the same SSB position 810 for receiving SSBs. Transmission beam adjustment message 825 may indicate the new SSB position 810 of the transmission beam 815 used by the UEs 115 of the UE group prior to the adjustment, or may indicate that a previously used transmission beam 815 will no longer be transmitted as part of the adjusted SSB transmission beam pattern. For instance, base station 105 may indicate to a first UE group that a previously used transmission beam 815 for the first UE group will no longer be transmitted, and may indicate to a second UE group a new SSB position 810 for a previously used transmission beam 815, may indicate to a third UE group a new SSB position 810 for a previously used transmission beam 815, and may indicate to a fourth UE group that a new transmission beam 815 will be used during a previously used SSB position 810. In such examples, base station 105 may send transmission beam adjustment message 825 via a number of group common DCIs for the different UE groups. Each group-common DCI may be assigned to one UE group that uses the same SSB position 810 to receive SSBs. The base station 105 may skip transmitting transmission beam adjustment message 825 to UEs not in the group that are not impacted by the change.

Upon receiving transmission beam adjustment message 825, a UE 115 may receive SSBs during the indicated new SSB positions 810 if a new SSB position 810 has been indicated. Otherwise, a UE 115 may perform beam scanning to find a new preferred. SSB position 810 for receiving SSBs, a new receive beam 820 on which to receive SSBs, or both. If a new SSB position 810 is indicated in transmission beam adjustment message 825, then a UE 115 may combine SSB received values at the old SSB position 810 before the adjustment (e.g., during SSB period 805-*a*) and at the new SSB position 810 after the adjustment (e.g., during SSB period 805-*b*). In some cases, the combined SSB values may fall within the same MIB period, as discussed in FIG. 3, and SSB values in different MIB periods may or may not be combined. The UE 115 may also detect whether an old received SSB position 810 is present in the new SSB transmission beam pattern. If the previously used SSB position 810 is not present in the new SSB transmission beam pattern, then the UE 115 may perform beam rescanning to find a new optimal SSB position 810 and receive beam 820.

In some examples, a UE 115 may indicate, to a base station 105, that it has determined to reuse a previously used receive beam 820 during the newly indicated SSB position 810. For example, the UE 115 may transmit a random access message (e.g., a random access preamble) using PRAM resources correspond to the new SSB position 810. Upon receiving the random access message, the base station 105 may determine that the UE 115 has successfully received transmission beam adjustment message 825. Base station 105 may thus use the new SSB position 810 to indicate QCL information to the UE in data transfer. When the base station 105 indicates the new SSB position 810 as QCL information in data transfer, the UE 115 may reuse an old receive beam 820 corresponding to the old transmission beam 815, which may be sent at the corresponding old SSB position 810, when receiving data and may use the receive beam 820 to receive the data. The connection between the new SSB position 810 and the old SSB position 810 may be indicated by the base station via the transmission beam adjustment message 825 without additional receive beam 820 determination.

FIG. 9 illustrates an example of a process flow 900 that supports indication of synchronization signal and physical broadcasting channel block transmission beam adjustment in accordance with aspects of the present disclosure. In some examples, process flow 900 may implement aspects of wireless communications system 100.

Base station 105-*m* and UE 115-*k* may be in communication with each other. In some examples, at 905, base station 105-*m* and UE 115-*k* may establish a communication link with each other. In some examples, at 905, UE 115-*k* and base station 105-*m* may synchronize a communication link using one or more synchronization signals, information carried in a MIB, or the like. In some examples, UE 115-*k* may perform one or more beam sweeping procedures and may identify a preferred receive beam on which to receive downlink signaling from base station 105-*m* (e.g., a receive beam determined by the UE 115-*k* to have a highest reference signal receive power (RSRP) measurement or other measurement where the UE 115-*k* measures each of the SSBs within at least one SSB period during a beam sweeping procedure). The preferred receive beam may correspond to a transmission beam for base station 105-*m* (e.g., the receive beam having the highest measured RSRP of the SSB positions).

At 910, in some cases, base station 105-*m* may send control information to UE 115-*k*. UE 115-*k* may receive the control information. In some examples, the control information may include first control signaling that indicates an SSB periodicity. The SSB may repeat using a plurality of transmission beams in accordance with the SSB periodicity. In some examples, the control information may include second control signaling that indicates a MIB periodicity. The MIB periodicity may have a longer duration than the SSB periodicity. Thus, the MIB periodicity may include one or more SSB periods, and the plurality of transmission beams may be used to subsequently send an SSB to UE H 5-*k* during one or more time intervals of each repeating SSB period.

At 915, base station 105-*m* may transmit an SSB over a set of transmission beams during respective time intervals of an SSB period. That is, base station 105-*m* may transmit the SSB during a first time interval using a first transmit beam.

At 920, UE 115-*k* may monitor the SSB (e.g., during the first time period) for the SSB. In some examples, UE 115-*k* may monitor during the first time period using a first receive beam that corresponds to a particular transmission beam. UE 115-*k* may successfully receive the SSB, based at least in part on the monitoring, during the first time interval using the transmission beam.

At 925, base station 105-*m* may determine to adjust the SSB transmission beam pattern used at 915. For instance, base station 105-*m* may detect an obstacle, a change in location, or other parameters that affect a parent link with a donor or parent IAB node, a child link with a child IAB node, an access link with UE 115-*k*, an access link with one or more other UEs 115, or the like. The detected change or obstacle may result in a change in one or more preferred transmission or receive beams for base station 105-*m*. Base station 105-*m* may thus determine to send the SSB at 935 using the transmission beam during a different (e.g., second) time interval.

At 930, base station 105-*m* may transmit, and UE 115-*k* may receive, a transmission beam adjustment message. The transmission beam adjustment message may indicate a change of one or more time intervals in which at least one transmission beam of the transmission beam pattern is utilized by base station 105-*m*. For instance, the transmission beam adjustment message may indicate that UE 115-k is to change from the first time interval to the second time interval in which the transmission beam will be utilized by base station 105-m to transmit the SSB at 935.

The transmission beam adjustment message may include a transmission beam index array that indicates that a respective transmission beam of a transmission beam pattern is utilized for a respective time interval of a plurality of different time intervals. Each respective element of the transmission beam index array may indicate a respective time interval of the plurality of different time intervals, and at least one transmission beam may be utilized prior to receiving the transmission beam adjustment message at 925. For instance, the transmission beam index array may include a set of transmission beam indexes in a set of respective elements (e.g., [1, 2, 3, 4]). Each transmission beam index may be located within the array at an element according to an adjusted time interval for the respective transmission beam, but the transmission beam index value may correspond to a previous (unadjusted) time interval of the respective transmission beam. Thus, at 915, base station 105-m may transmit the SSB using the transmission beam during a first time interval (e.g., time interval 1 of 4, represented in the first element of the transmission beam index array [1, 2, 3, 4]). If at 925 base station 105-m decides to transmit the SSB using the transmission beam during a second time interval (e.g., a second time interval of 4 represented by the second element of the transmission beam index array), then the transmission beam index for the transmission beam may be located in the second element of the transmission beam index array (e.g., [2, 1, 3, 4]). Thus, UE 115-k may receive the transmission beam adjustment message at 930, and may determine that the transmission beam previously used to send the SSB at 915 during the first time interval, is not being used to send the SSB at 935 during the second time interval.

In some examples, the transmission beam adjustment message may be addressed to all connected TEs. The transmission beam adjustment message may be a common DCI addressed to a common RNTI.

In some examples, the transmission beam adjustment message may be individually addressed to UE 115-k. In such examples, the transmission beam adjustment message may indicate that the transmission beam of the SSB received by UE 115-k prior to receiving the transmission beam adjustment message is not to be utilized after receiving the transmission beam adjustment message. In some examples, the transmission beam adjustment message may indicate that the transmission beam of the SSB received by the UE 115-k at a first time interval prior to receiving the transmission beam adjustment message is utilized at a second time interval; after receiving the transmission beam adjustment message. In some examples, a dedicated transmission beam adjustment message may be a dedicated RRC message, a dedicated MAC CE, a dedicated DCI, or any combination thereof.

In some examples, the transmission beam adjustment message may be addressed to a group of UEs 115 that includes UE 115-k. In such examples, the transmission beam adjustment message may indicate that the transmission beam of the synchronization signal and physical broadcasting channel block that is received by the group of UEs that includes the UE at a first time interval prior to receiving the transmission beam adjustment message is utilized at a second time interval after receiving the transmission beam adjustment message. In some examples, the transmission beam adjustment message may indicate the second transmission beam of the synchronization signal and physical broadcasting channel block that is received by the group of UEs that includes the UE prior to receiving the transmission beam adjustment message is not to be utilized during any time interval after receiving the transmission beam adjustment message. The transmission beam adjustment message addressed to the group of UEs 115 may be a group-common DCI.

In some examples, the transmission beam adjustment message may indicate that a transmission beam is no longer utilized fir any time interval of the transmission beam pattern. In such examples, UE 115-k may perform beam scanning to identify a second transmission beam and a corresponding time interval in which the second transmission beam is utilized to transmit a second synchronization signal and physical broadcasting channel block.

At 935, base station 105-m may transmit the SSB during a set of time intervals using respective transmit beams, according to the adjusted SSB transmission beam pattern.

At 940, UE 115-k may monitor the SSB during a second time interval. For example, upon receiving the transmission beam adjustment message at 930, UE 115-k may determine that at 935, base station 105-m will transmit the SSB on the transmission beam during the second time interval, instead of during the first time interval. UE 115-k may monitor the SSB during the second time interval using the receive beam that corresponds to the transmission beam, and may receive the SSB during the second time interval as a result of having received the transmission beam adjustment message at 930.

In some examples, UE 115-k may receive a first SSB value at 915 during the first time interval, and a second SSB value during the second time interval at 935, after having received the transmission beam adjustment message. UE 115-k ma combine the first SSB value and the second SSB value to detect a synchronization signal (e.g., a PSS, SSS, or the like), decode a PBCH, or both.

In some examples, UE 115-k may transmit a random access message (e.g., a random access preamble) during a random access resource corresponding to the second time interval. In some cases, base station 105-m may indicate a change in time interval via the transmission beam adjustment message for UE 115-k based on a relationship between the transmission beam and the random access resource.

In some examples, UE 115-c may receive from base station 105-m QCL information that includes the second time interval, and may monitor for data transmissions using the receive beam based at least in part on the data transfer QCL information.

Figure 10:
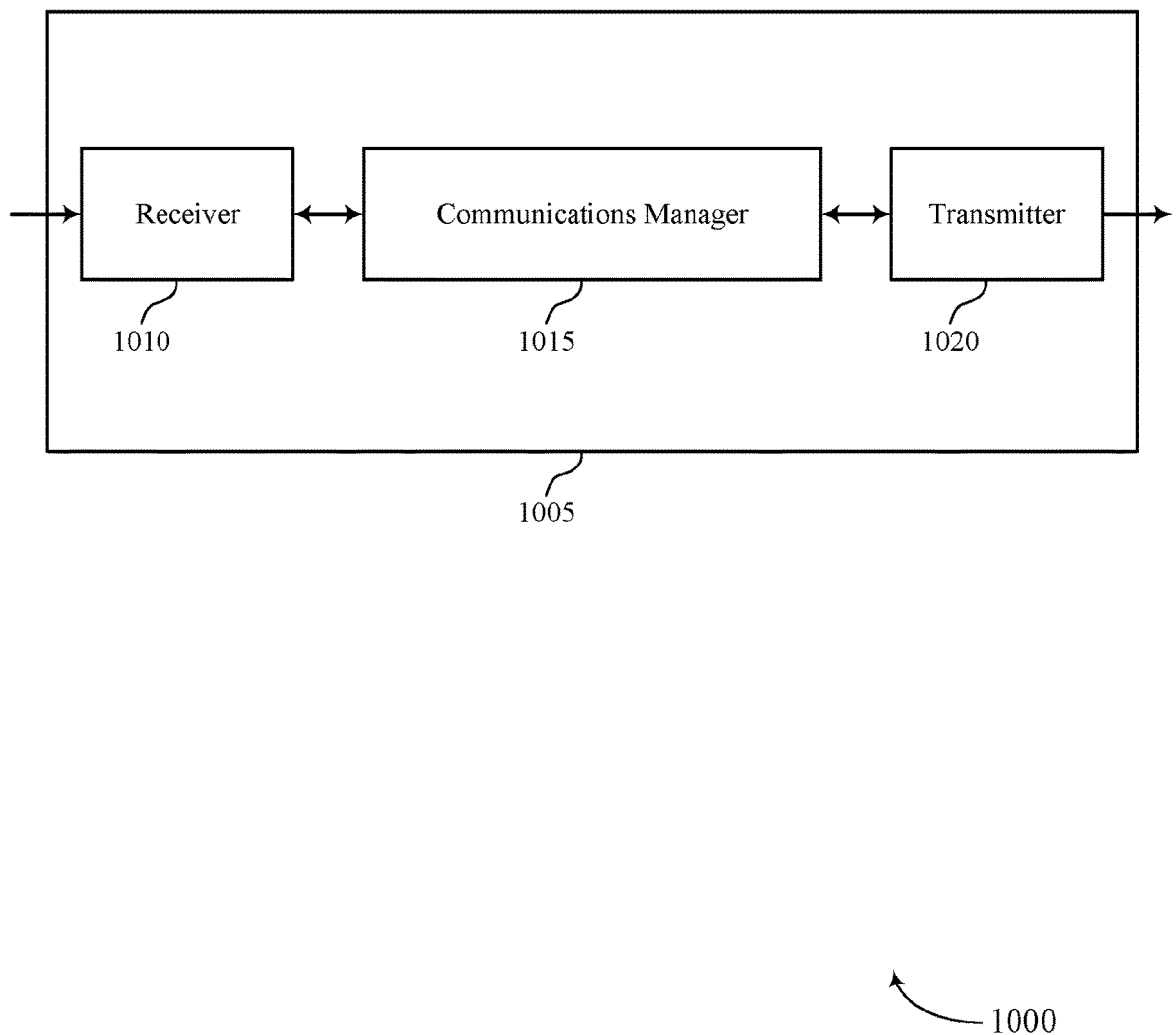
FIGS. 10 and 11 show block diagrams of devices that support an indication of synchronization signal and physical broadcasting channel block transmission beam adjustment in accordance with aspects of the present disclosure.

FIG. 10 shows a block diagram 1000 of a device 1005 that supports indication of synchronization signal and physical broadcasting channel block transmission beam adjustment in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of synchronization signal and physical broadcasting channel block transmission beam adjustment, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a transmission beam adjustment message indicating a change from a first time interval to a second time interval in which a transmission beam is utilized to transmit a synchronization signal and physical broadcasting channel block and monitor, during the second time interval, the synchronization signal and physical broadcasting channel block using a receive beam that corresponds to the transmission beam. The communications manager 1015 may be an example of aspects of the communications manager 1310 described herein.

The communications manager 1015, or its sub-components, may be implemented in hardware, code (e.g., software or Firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 may be implemented as an integrated circuit or chipset for a mobile device modem, and the receiver 1010 and transmitter 1020 may be implemented as analog components (e.g., amplifiers, filters, antennas) coupled with the mobile device modem to enable wireless transmission and reception over one or more bands.

The communications manager 1015 as described herein may be implemented to realize one or more potential advantages. One implementation may allow the device 1005 to receive a transmission beam adjustment message indicating a change from a first time interval to a second time interval, and monitor during the second interval, for a synchronization signal and physical broadcasting channel block using a receive beam that corresponds to the transmission beam. Receiving the transmission beam adjustment message indicating the change, and monitoring based thereon, may result in decreased system congestion, decreased latency at a device, and improved user experience. The described techniques performed by the integrated circuit or chipset may increase reliability and decrease signaling overhead.

Figure 11:
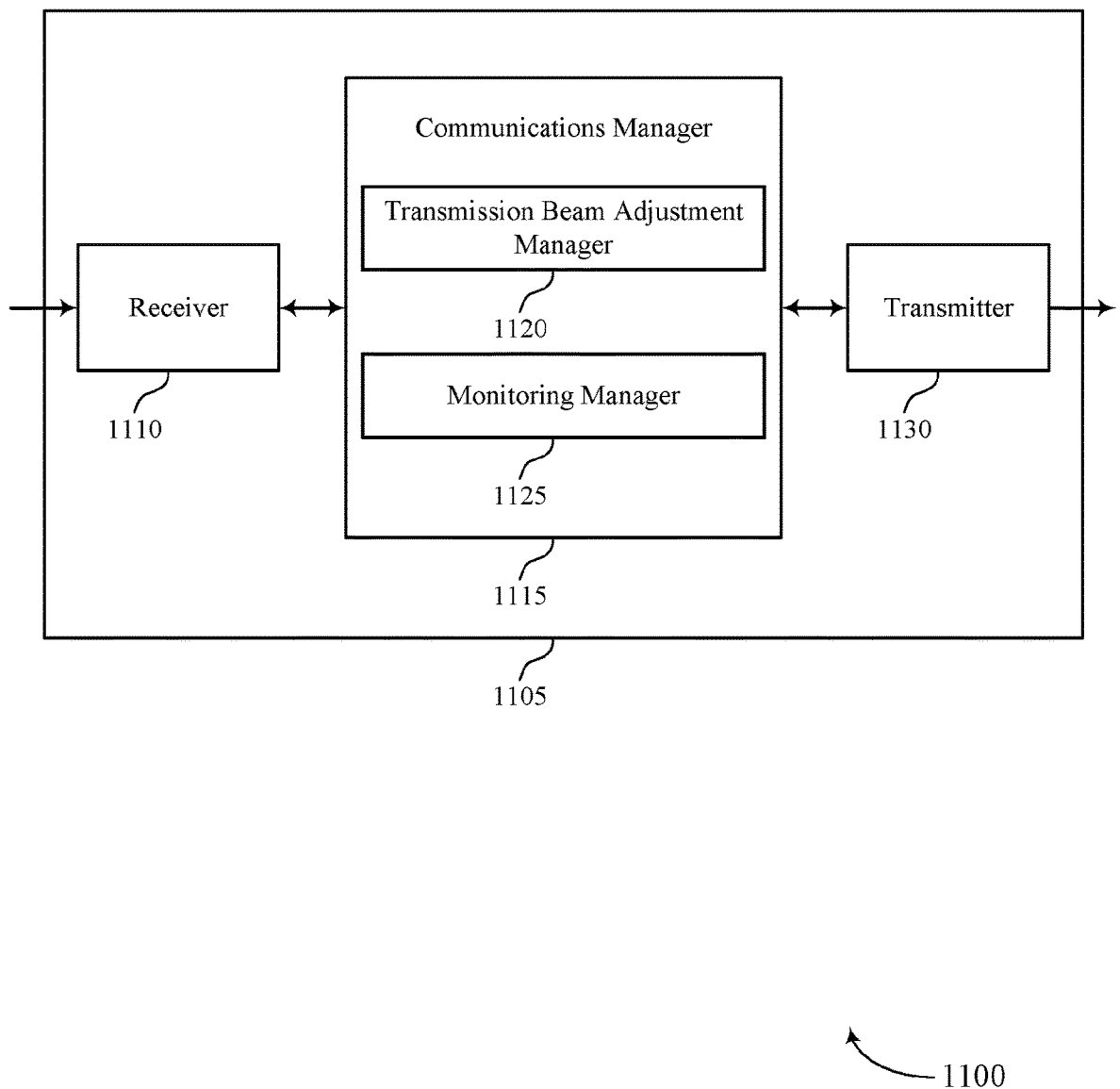

FIG. 11 shows a block diagram 1100 of a device 1105 that supports indication of synchronization signal and physical broadcasting channel block transmission beam adjustment in accordance with aspects of the present disclosure. The device 1105 may be an example of aspects of a device 1005, or a UE 115 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to indication of synchronization signal and physical broadcasting channel block transmission beam adjustment, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a transmission beam adjustment manager 1120 and a monitoring manager 1125. The communications manager 1115 may be an example of aspects of the communications manager 1310 described herein.

The transmission beam adjustment manager 1120 may receive a transmission beam adjustment message indicating a change from a first time interval to a second time interval in which a transmission beam is utilized to transmit a synchronization signal and physical broadcasting channel block.

The monitoring manager 1125 may monitor, during the second time interval, the synchronization signal and physical broadcasting channel block using a receive beam that corresponds to the transmission beam.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
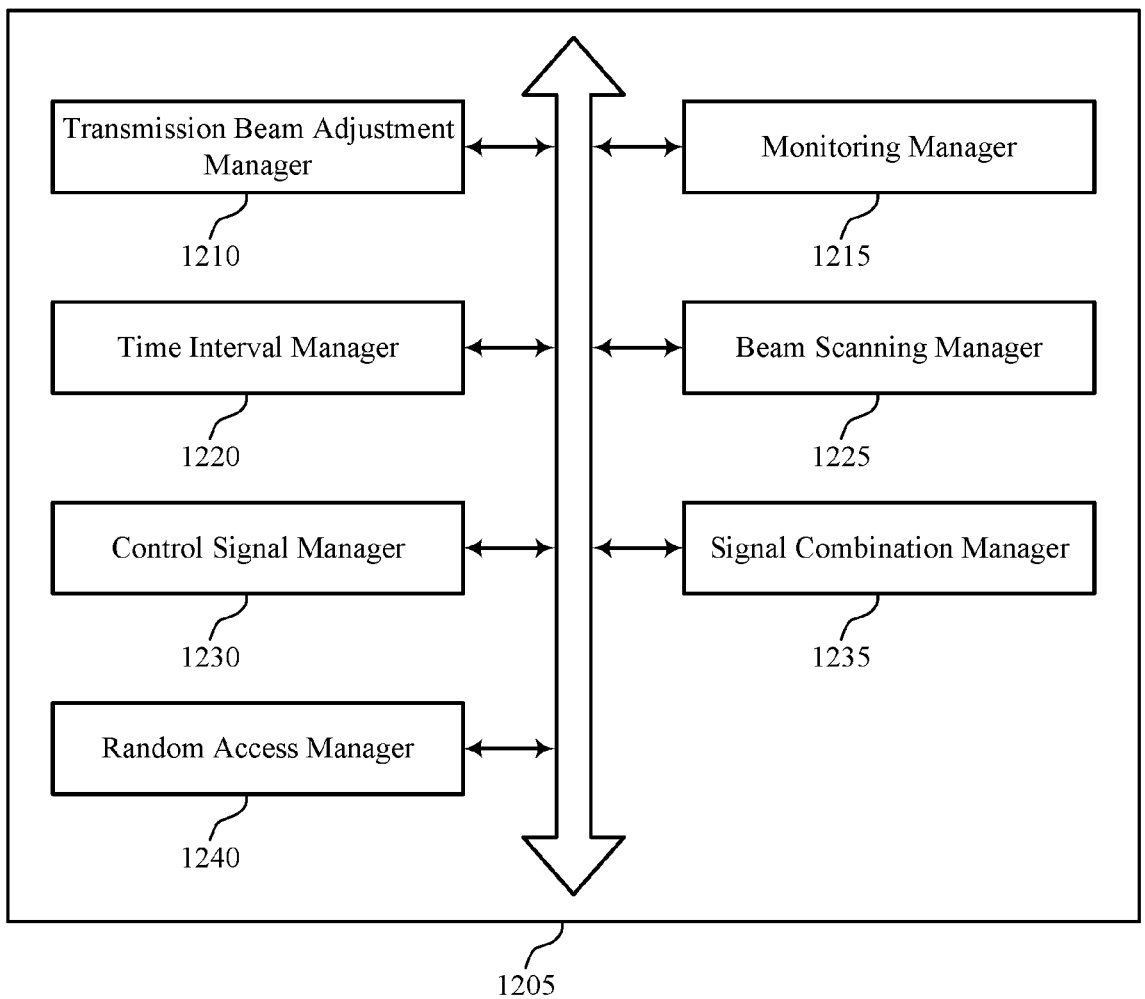
FIG. 12 shows a block diagram of a communications manager that supports indication of synchronization signal and physical broadcasting channel block transmission beam adjustment in accordance with aspects of the present disclosure.

FIG. 12 shows a block diagram 1200 of a communications manager 1205 that supports indication of synchronization signal and physical broadcasting channel block transmission beam adjustment in accordance with aspects of the present disclosure. The communications manager 1205 may be an example of aspects of a communications manager 1015, a communications manager 1115, or a communications manager 1310 described herein. The communications manager 1205 may include a transmission beam adjustment manager 1210, a monitoring manager 1215, a time interval manager 1220, a beam scanning manager 1225, a control signal manager 1230, a signal combination manager 1235, and a random access manager 1240. Each of these modules may communicate, directly or indirectly, with one another (e.g., via one or more buses).

The transmission beam adjustment manager 1210 may receive a transmission beam adjustment message indicating a change from a first time interval to a second time interval in which a transmission beam is utilized to transmit a synchronization signal and physical broadcasting channel block. In some examples, the transmission beam adjustment manager 1210 may receive the transmission beam adjustment message that is individually addressed to the UE.

In some examples, the transmission beam adjustment manager 1210 may receive the transmission beam adjustment message that is addressed to a group of UEs that includes the UE. In some cases, a respective element of the transmission beam index array indicates a respective time interval of the set of different time intervals, and where at least one transmission beam is utilized prior to receiving the transmission beam adjustment message. In some cases, the transmission beam index array includes a defined value corresponding to at least one time interval of the set of time intervals to indicate that a new transmission beam is being utilized to transmit within the at least one time interval. In some cases, the transmission beam of the synchronization signal and physical broadcasting channel block that is received by the UE prior to receiving the transmission beam adjustment message is utilized in the second time interval after receiving the transmission beam adjustment message. In some cases, the transmission beam adjustment message indicates that the transmission beam of the synChronization signal and physical broadcasting channel block that is received by the UE prior to receiving the transmission beam adjustment message is not to be utilized after receiving the transmission beam adjustment message.

In some cases, the transmission beam adjustment message is a dedicated radio resource control message, a dedicated MAC CE, dedicated downlink control information, or any combination thereof. In some cases, the transmission beam adjustment message indicates a second time interval (e.g., second time slot), wherein the transmission beam of the synchronization signal and physical broadcasting channel block that is received by the group of UEs that includes the UE prior to receiving the transmission beam adjustment message is utilized in the second time interval after receiving the transmission beam adjustment message. In some cases, the transmission beam adjustment message indicates that the transmission beam of the synchronization signal and physical broadcasting channel block that is received by the group of UEs that includes the UE prior to receiving the transmission beam adjustment message is not to be utilized during any time interval after receiving the transmission beam adjustment message. In some cases, the transmission beam adjustment message is group-common downlink control information. In some cases, the transmission beam adjustment message is common downlink control information addressed to a common radio network temporary identifier.

The monitoring manager 1215 may monitor, during the second time interval, the synchronization signal and physical broadcasting channel block using a receive beam that corresponds to the transmission beam. In some examples, the monitoring manager 1215 may receive, during the second time interval, the synchronization signal and physical broadcasting channel block using the receive beam. In some examples, the monitoring manager 1215 may monitor for a data transmission using the receive beam based on the data transfer quasi co-location information. The time interval manager 1220 may receive the transmission beam adjustment message indicating a change of one or more time intervals in which at least one transmission beam of a transmission beam pattern is utilized. In some examples, the time interval manager 1220 may receive a second transmission beam adjustment message indicating the transmission beam is no longer utilized for any time interval of a transmission beam pattern. In some examples, the time interval manager 1220 may receive the transmission beam adjustment message indicating a transmission beam index array that indicates that a respective transmission beam of a transmission beam pattern is utilized for a respective time interval of a set of different time intervals. In some examples, the time interval manager 1220 may receive data transfer quasi co-location information that indicates the second time interval.

The beam scanning manager 1225 may perform beam scanning to identify a second transmission beam and a corresponding time interval in which the second transmission beam is utilized to transmit a second synchronization signal and physical broadcasting channel block.

The control signal manager 1230 may receive first control signaling that indicates a synchronization signal and physical broadcasting channel block periodicity, where the synchronization signal and physical broadcasting channel block repeats using a set of transmission beams in accordance with the synchronization signal and physical broadcasting channel block periodicity. In some examples, the control signal manager 1230 may receive second control signaling that indicates a master information block periodicity, where the master information block periodicity has a longer duration than the synchronization signal and physical broadcasting channel block periodicity.

The signal combination manager 1235 may receive a first synchronization signal and physical broadcasting channel block value during the first time interval prior to receiving the transmission beam adjustment message and a second synchronization signal and physical broadcasting channel block value during the second time interval after receiving the transmission beam adjustment message. In some examples, the signal combination manager 1235 may combine the first synchronization signal and physical broadcasting channel block value with the second synchronization signal and physical broadcasting channel block value to detect a synchronization signal, decode a physical broadcasting channel, or both.

The random access manager 1240 may transmit a random access preamble during a random access resource corresponding to the second time interval.

Figure 13:
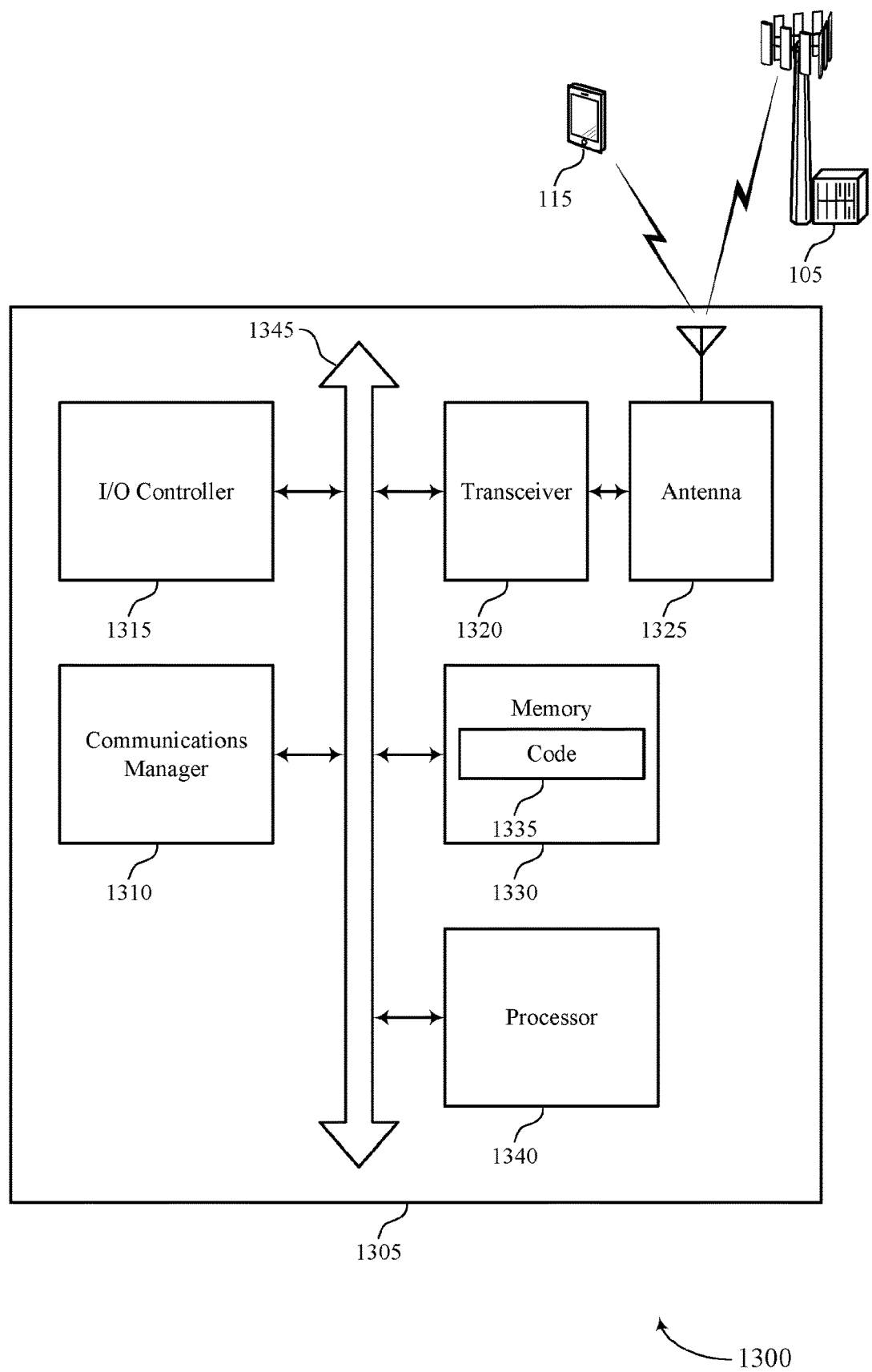
FIG. 13 shows a diagram of a system including a device that supports indication of synchronization signal and physical broadcasting channel block transmission beam adjustment in accordance with aspects of the present disclosure.

FIG. 13 shows a diagram of a system 1300 including a device 1305 that supports indication of synchronization signal and physical broadcasting channel block transmission beam adjustment in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive a transmission beam adjustment message indicating a change from a first time interval to a second time interval in which a transmission beam is utilized to transmit a synchronization signal and physical broadcasting channel block and monitor, during the second time interval, the synchronization signal and physical broadcasting channel block using a receive beam that corresponds to the transmission beam.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WIN- DOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting indication of synchronization signal and physical broadcasting channel block transmission beam adjustment).

Figure 14:
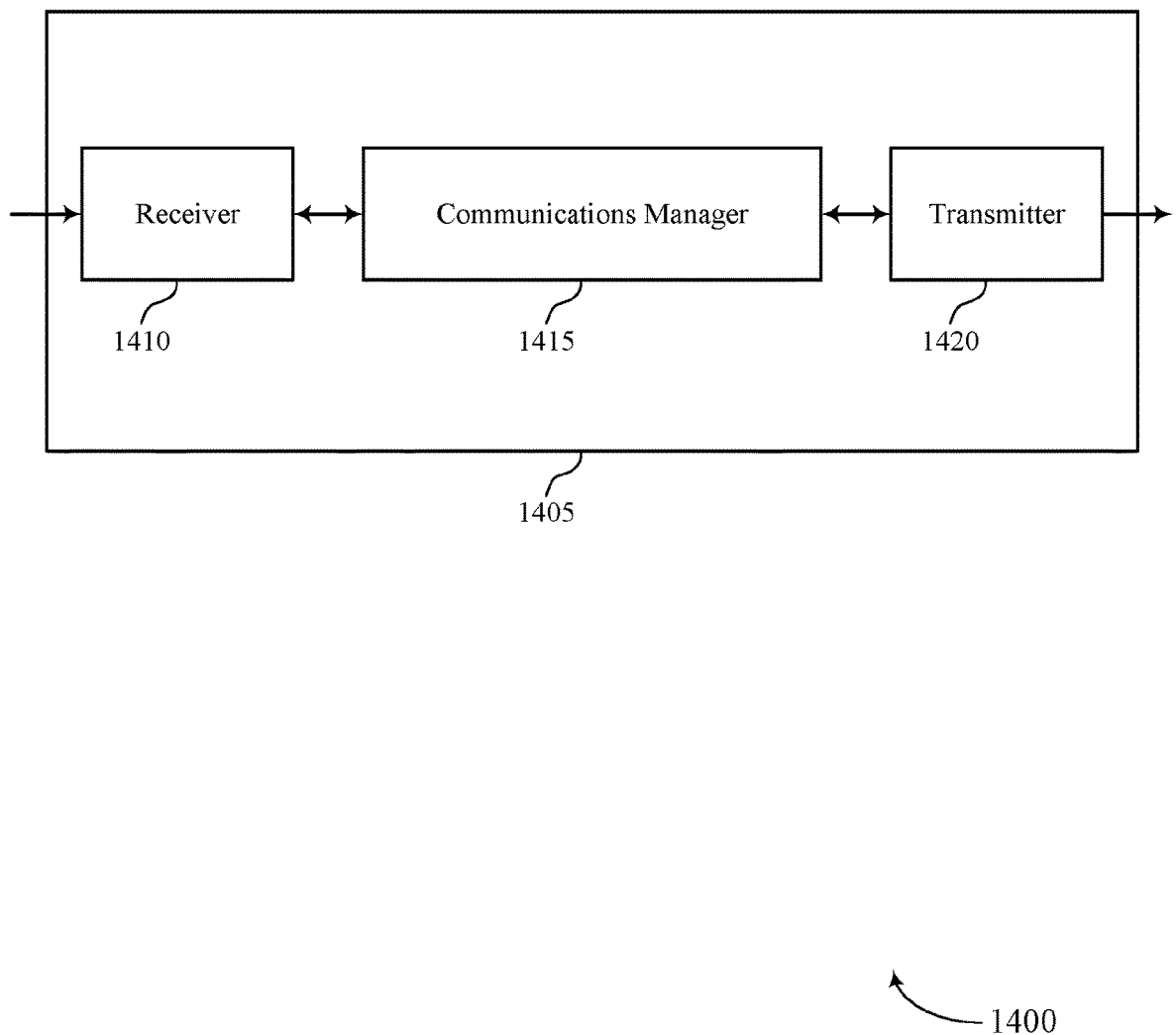
FIGS. 14 and 15 show block diagrams of devices that support an indication of synchronization signal and physical broadcasting channel block transmission beam adjustment in accordance with aspects of the present disclosure.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein, FIG. 14 shows a block diagram 1400 of a device 1405 that supports indication of synchronization signal and physical broadcasting channel block transmission beam adjustment in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to indication of synchronization signal and physical broadcasting channel block transmission beam adjustment, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit, to a UE, a transmission beam adjustment message indicating a change from a first time interval to a second time interval in which a transmission beam is utilized to transmit a synchronization signal and physical broadcasting channel block and transmit, during the second time interval, the synchronization signal and physical broadcasting channel block using the transmission beam. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

In some examples, the communications manager 1415 may be implemented as an integrated circuit or chipset for a mobile device modem, and the receiver 1410 and transmitter 1420 may be implemented as analog components (e.g., amplifiers, filters, antennas) coupled with the mobile device modem to enable wireless transmission and reception over one or more bands.

The communications manager 1415 as described herein may be implemented to realize one or more potential advantages. One implementation may allow the device 1405 to transmit, to a UE, a transmission beam adjustment message indicating a change from a first time interval to a second time interval in which a transmission beam is utilized to transmit a synchronization signal and physical broadcasting channel block, and transmit, during the second time interval, the synchronization signal and physical broadcasting channel block using the transmission beam. Receiving the transmission beam adjustment message and transmitting the synchronization signal and physical broadcasting channel block using the indicated transmission beam may result in decreased system congestion, decreased latency at a device, and improved user experience. The described techniques performed by the integrated circuit or chipset may increase reliability and decrease signaling overhead.

Figure 15:
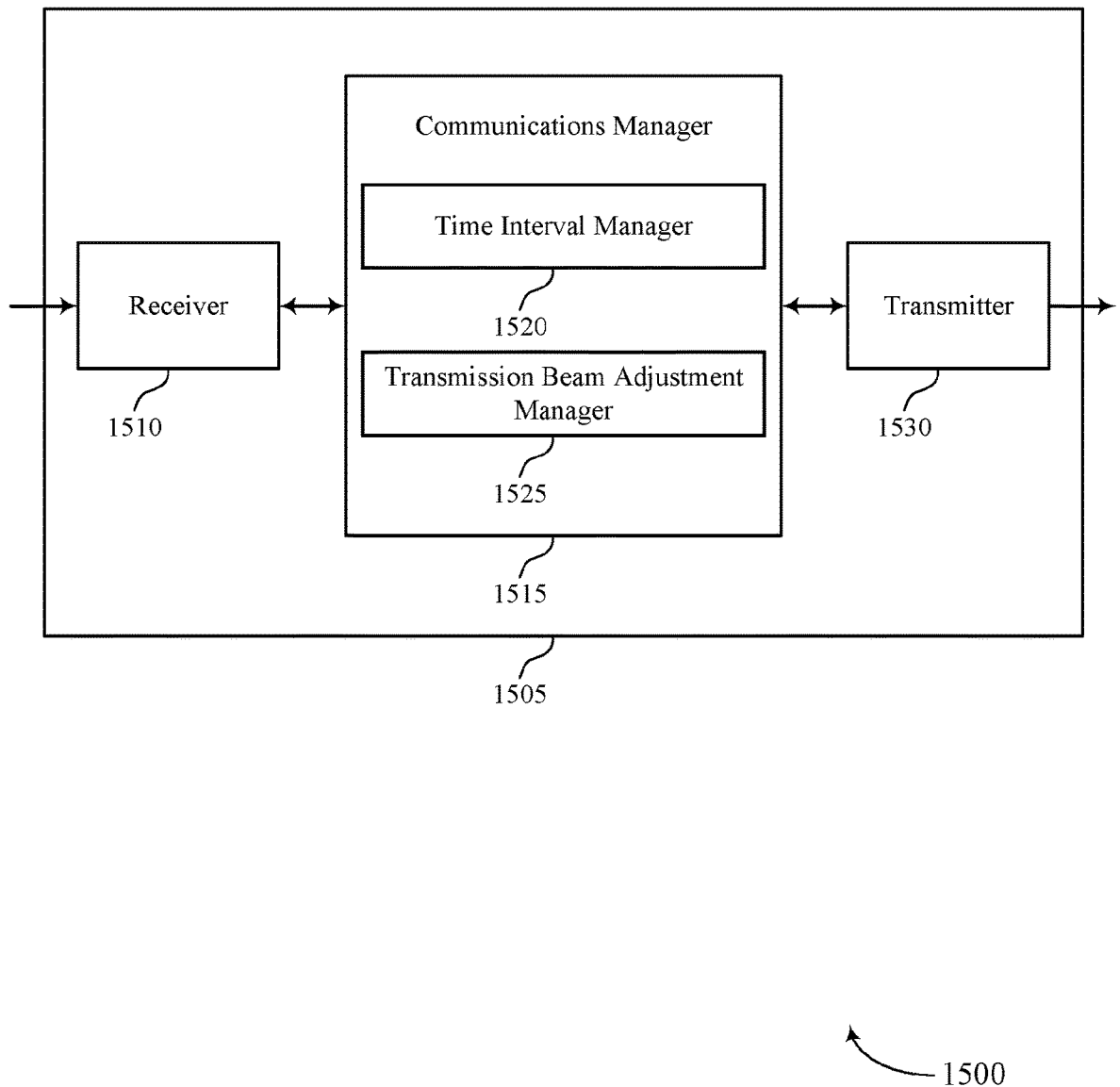

FIG. 15 shows a block diagram 1500 of a device 1505 that supports indication of synchronization signal and physical broadcasting channel block transmission beam adjustment in accordance with aspects of the present disclosure. The device 1505 may be an example of aspects of a device 1405, or a base station 105 as described herein. The device 1505 may include a receiver 1510, a communications manager 1515, and a transmitter 1530. The device 1505 may also include a processor. Each of these components may be in communication with one another (e.g., via one or more buses).

The receiver 1510 may receive information such as packets, user data, or control information associated with various information channels (e.g., control channels, data channels, and information related to indication of synchronization signal and physical broadcasting channel block transmission beam adjustment, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a time interval manager 1520 and a transmission beam adjustment manager 1525. The communications manager 1515 may be an example of aspects of the communications manager 1710 described herein.

The time interval manager 1520 may transmit, to a UE, a transmission beam adjustment message indicating a change from a first time interval to a second time interval in which a transmission beam is utilized to transmit a synchronization signal and physical broadcasting channel block.

The transmission beam adjustment manager 1525 may transmit, during the second time interval, the synchronization signal and physical broadcasting channel block using the transmission beam.

The transmitter 1530 may transmit signals generated by other components of the device 1505. In some examples, the transmitter 1530 may be collocated with a receiver 1510 in a transceiver module. For example, the transmitter 1530 may be an example of aspects of the transceiver 1720 described with reference to FIG. 17. The transmitter 1530 may utilize a single antenna or a set of antennas.

Figure 16:
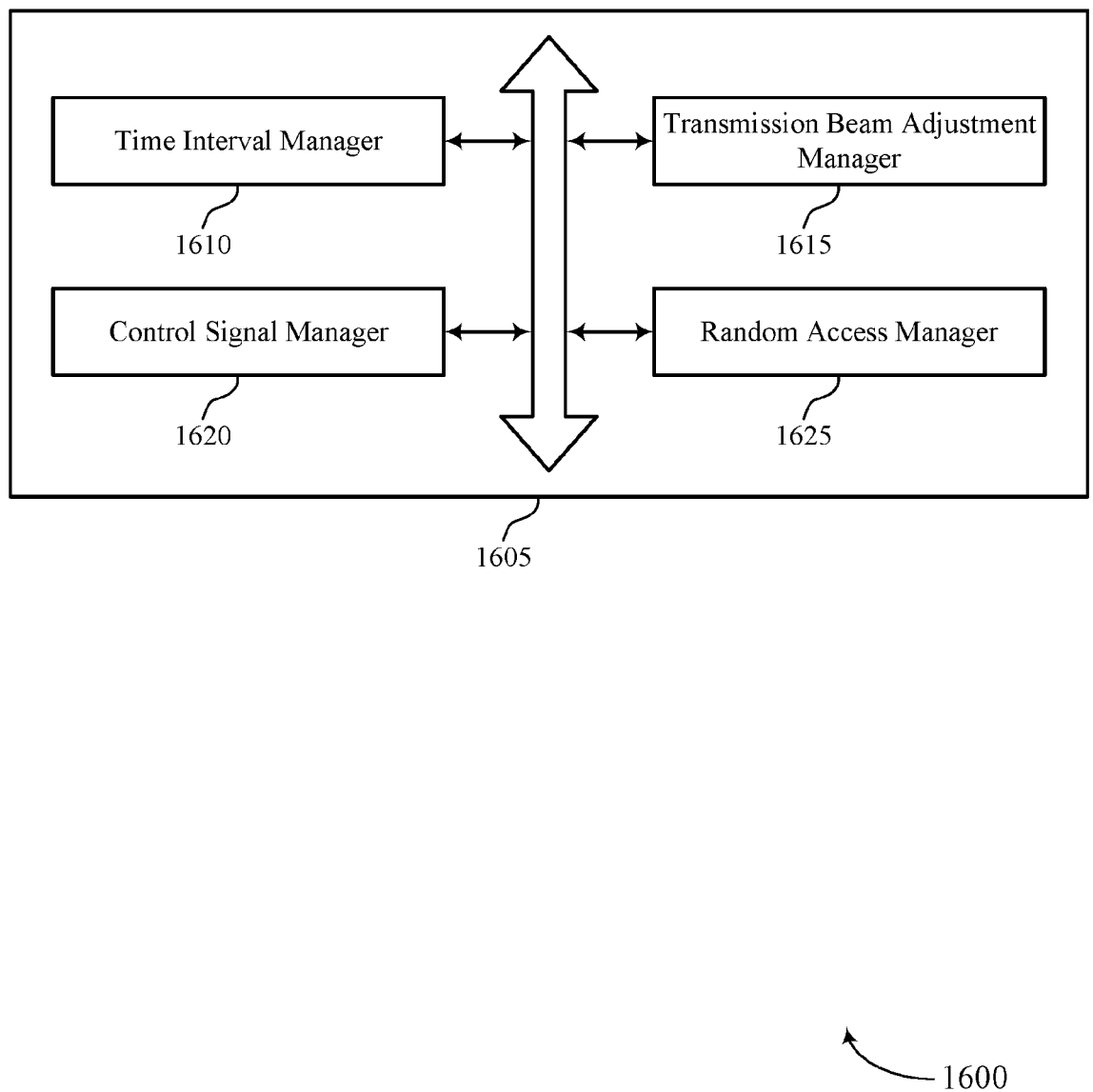
FIG. 16 shows a block diagram of a communications manager that supports indication of synchronization signal and physical broadcasting channel block transmission beam adjustment in accordance with aspects of the present disclosure.

FIG. 16 shows a block diagram 1600 of a communications manager 1605 that supports indication of synchronization signal and physical broadcasting channel block transmission beam adjustment in accordance with aspects of the present disclosure. The communications manager 1605 may be an example of aspects of a communications manager 1415, a communications manager 1515, or a communications manager 1710 described herein. The communications manager 1605 may include a time interval manager 1610, a transmission beam adjustment manager 1615, a control signal manager 1620, and a random access manager 1625. Each of these modules may communicate, directly or indirectly, with one another (e.g., via one or more buses).

The time interval manager 1610 may transmit, to a UE, a transmission beam adjustment message indicating a change from a first time interval to a second time interval in which a transmission beam is utilized to transmit a synchronization signal and physical broadcasting channel block. In some examples, the time interval manager 1610 may transmit the transmission beam adjustment message indicating a change of one or more time intervals in which at least one transmission beam of a transmission beam pattern is utilized. In some examples, the time interval manager 1610 may transmit the transmission beam adjustment message indicating a transmission beam index array that indicates that a respective transmission beam of a transmission beam pattern is utilized for a respective time interval of a set of different time intervals.

In some examples, the time interval manager 1610 may transmit data transfer quasi co-location information that indicates the second time interval. In some cases, a respective element of the transmission beam index array indicates a respective time interval of the set of different time intervals, and where at least one transmission beam is utilized prior to receiving the transmission beam adjustment message. In some cases, the transmission beam index array includes a defined value corresponding to at least one time interval of the set of time intervals to indicate that a new transmission beam is being utilized to transmit within the at least one time interval.

The transmission beam adjustment manager 1615 may transmit, during the second time interval, the synchronization signal and physical broadcasting channel block using the transmission beam. In some examples, the transmission beam adjustment manager 1615 may transmit a second transmission beam adjustment message indicating the transmission beam is no longer utilized for any time interval of a transmission beam pattern. In some examples, the transmission beam adjustment manager 1615 may transmit the transmission beam adjustment message that is individually addressed to the UE. In some examples, the transmission beam adjustment manager 1615 may transmit the transmission beam adjustment message that is addressed to a group of UEs that includes the UE.

In some examples, the transmission beam adjustment manager 1615 may transmit a data transmission using the transmission beam based on the data transfer quasi co-location information. In some cases, the transmission beam of the synchronization signal and physical broadcasting channel block that is received by the UE prior to receiving the transmission beam adjustment message is utilized in the second time interval after receiving the transmission beam adjustment message. In some cases, the transmission beam adjustment message indicates that the transmission beam of the synchronization signal and physical broadcasting channel block that is received by the UE prior to receiving the transmission beam adjustment message is not to be utilized after receiving the transmission beam adjustment message. In some cases, the transmission beam adjustment message is a dedicated radio resource control message, a dedicated MAC CE, dedicated downlink control information, or any combination thereof.

In some cases, the transmission beam adjustment message indicates a second time interval, wherein the transmission beam of the synchronization signal and physical broadcasting channel block that is received by the group of UEs that includes the UE prior to receiving the transmission beam adjustment message is utilized in the second time interval after receiving the transmission beam adjustment message. In some cases, the transmission beam adjustment message indicates that the transmission beam of the synchronization signal and physical broadcasting channel block that is received by the group of UEs that includes the UE prior to receiving the transmission beam adjustment message is not to be utilized during any time interval after receiving the transmission beam adjustment message. In some cases, the transmission beam adjustment message is group-common downlink control information. In some cases, the transmission beam adjustment message is common downlink control information addressed to a common radio network temporary identifier.

The control signal manager 1620 may transmit first control signaling that indicates a synchronization signal and physical broadcasting channel block periodicity, where the synchronization signal and physical broadcasting channel block repeats in accordance with the synchronization signal and physical broadcasting channel block periodicity. In some examples, the control signal manager 1620 may transmit second control signaling that indicates a master information block periodicity, where the master information block periodicity has a longer duration than the synchronization signal and physical broadcasting channel block periodicity.

The random access manager 1625 may receive a random access preamble during a random access resource corresponding to the second time interval.

Figure 17:
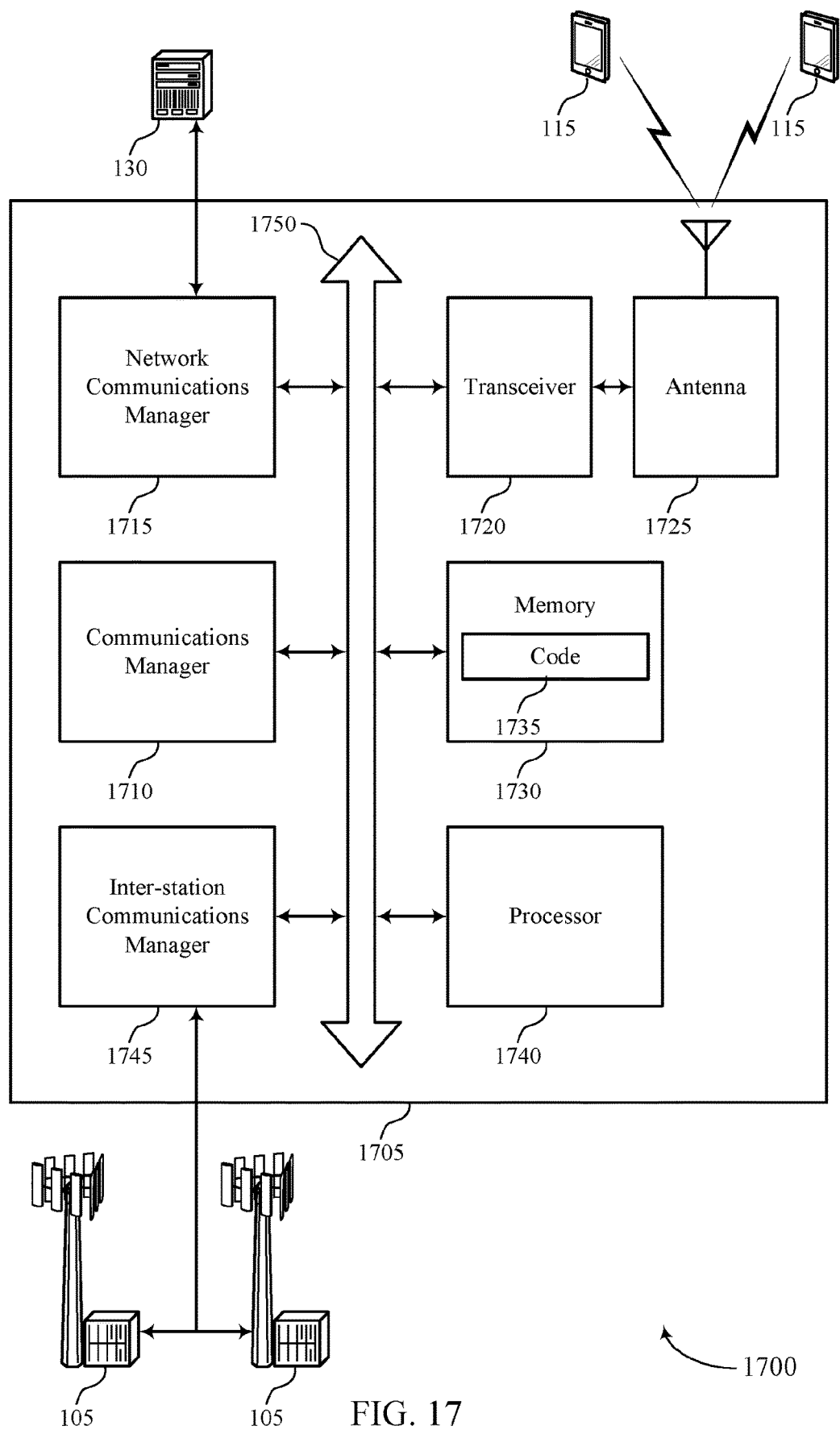
FIG. 17 shows a diagram of a system including a device that supports indication of synchronization signal and physical broadcasting channel block transmission beam adjustment in accordance with aspects of the present disclosure.

FIG. 17 shows a diagram of a system 1700 including a device 1705 that supports indication of synchronization signal and physical broadcasting channel block transmission beam adjustment in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit, to a UE, a transmission beam adjustment message indicating a change from a first time interval to a second time interval in which a transmission beam is utilized to transmit a synchronization signal and physical broadcasting channel block and transmit, during the second time interval, the synchronization signal and physical broadcasting channel block using the transmission beam.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate hi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device. (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting indication of synchronization signal and physical broadcasting channel block transmission beam adjustment).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
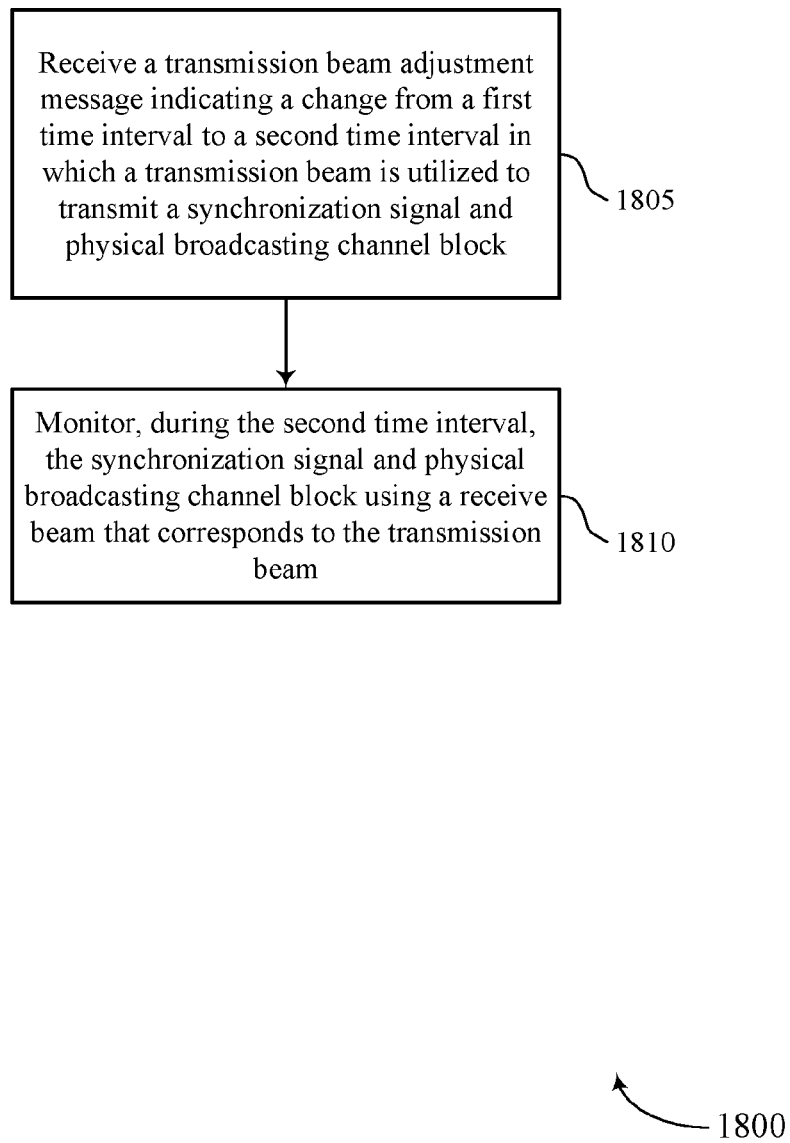
FIGS. 18 through 21 show flowcharts illustrating methods that support an indication of synchronization signal and physical broadcasting channel block transmission beam adjustment in accordance with aspects of the present disclosure.

FIG. 18 shows a flowchart illustrating a method 1800 that supports indication of synchronization signal and physical broadcasting channel block transmission beam adjustment in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally, or alternatively, a UE, may perform aspects of the functions described below using special-purpose hardware.

At 1805, the UE may receive a transmission beam adjustment message indicating a change from a first time interval to a second time interval in which a transmission beam is utilized to transmit a synchronization signal and physical broadcasting channel block. The operations of 1805 may be performed according to the methods described herein. In some examples, aspects of the operations of 1805 may be performed by a transmission beam adjustment manager as described with reference to FIGS. 10 through 13.

At 1810, the UE may monitor, during the second time interval, the synchronization signal and physical broadcasting channel block using a receive beam that corresponds to the transmission beam. The operations of 1810 may be performed according to the methods described herein. In some examples, aspects of the operations of 1810 may be performed by a monitoring manager as described with reference to FIGS. 10 through 13.

Figure 19:
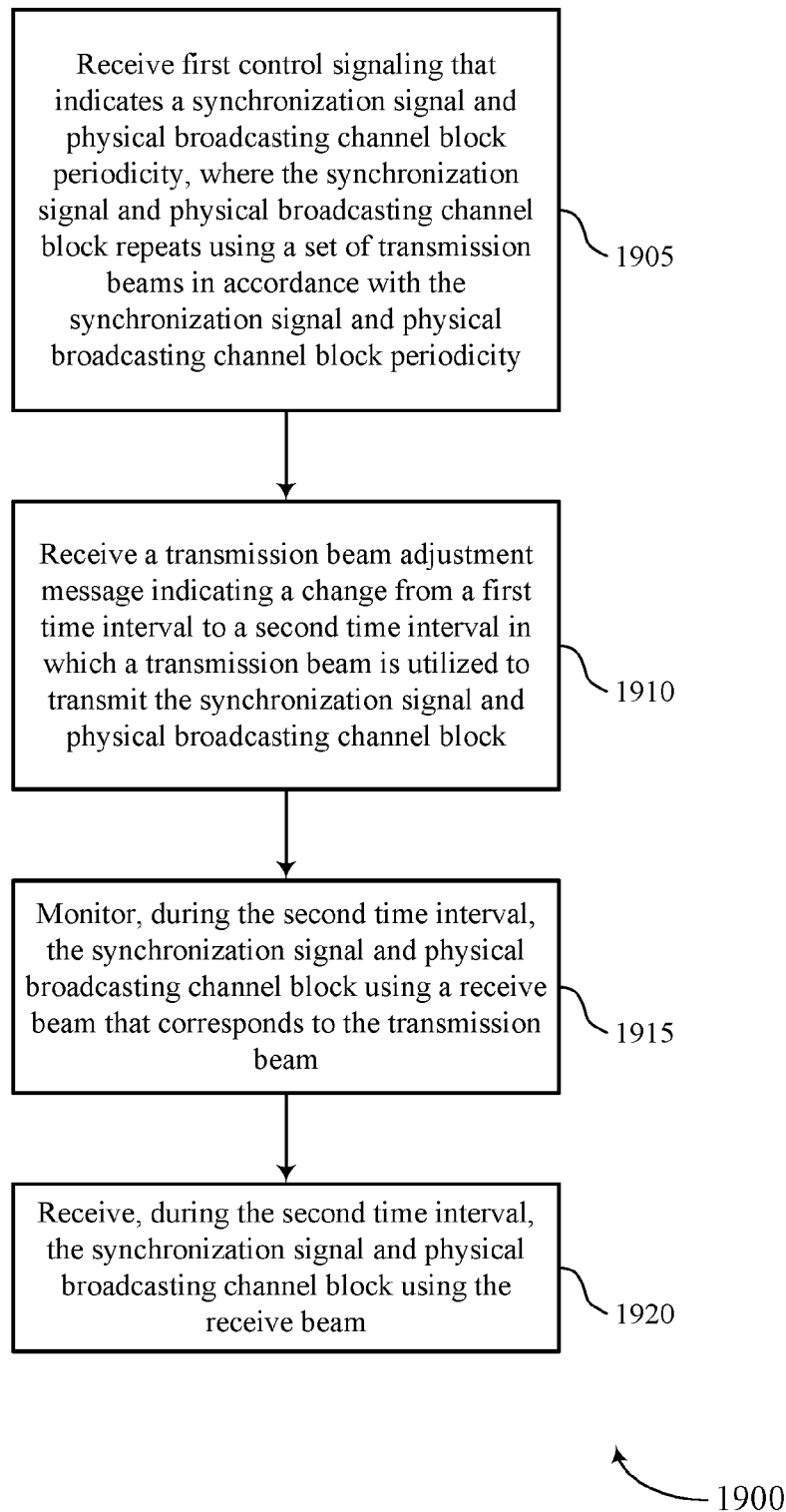

FIG. 19 shows a flowchart illustrating a method 1900 that supports indication of synchronization signal and physical broadcasting channel block transmission beam adjustment in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 1905, the UE may receive first control signaling that indicates a synchronization signal and physical broadcasting channel block periodicity, where the synchronization signal and physical broadcasting channel block repeats using a set of transmission beams in accordance with the synchronization signal and physical broadcasting channel block periodicity. The operations of 1905 may be performed according to the methods described herein. In some examples, aspects of the operations of 1905 may be performed by a control signal manager as described with reference to FIGS. 10 through 13.

At 1910, the UE may receive a transmission beam adjustment message indicating a change from a first time interval to a second time interval in which a transmission beam is utilized to transmit the synchronization signal and physical broadcasting channel block. The operations of 1910 may be performed according to the methods described herein. In some examples, aspects of the operations of 1910 may be performed by a transmission beam adjustment manager as described with reference to FIGS. 10 through 13.

At 1915, the UE may monitor, during the second time interval, the synchronization signal and physical broadcasting channel block using a receive beam that corresponds to the transmission beam. The operations of 1915 may be performed according to the methods described herein. In some examples, aspects of the operations of 1915 may be performed by a monitoring manager as described with reference to FIGS. 10 through 13.

At 1920, the UE may receive, during the second time interval, the synchronization signal and physical broadcasting channel block using the receive beam. The operations of 1920 may be performed according to the methods described herein. In some examples, aspects of the operations of 1920 may be performed by a monitoring manager as described with reference to FIGS. 10 through 13.

Figure 20:
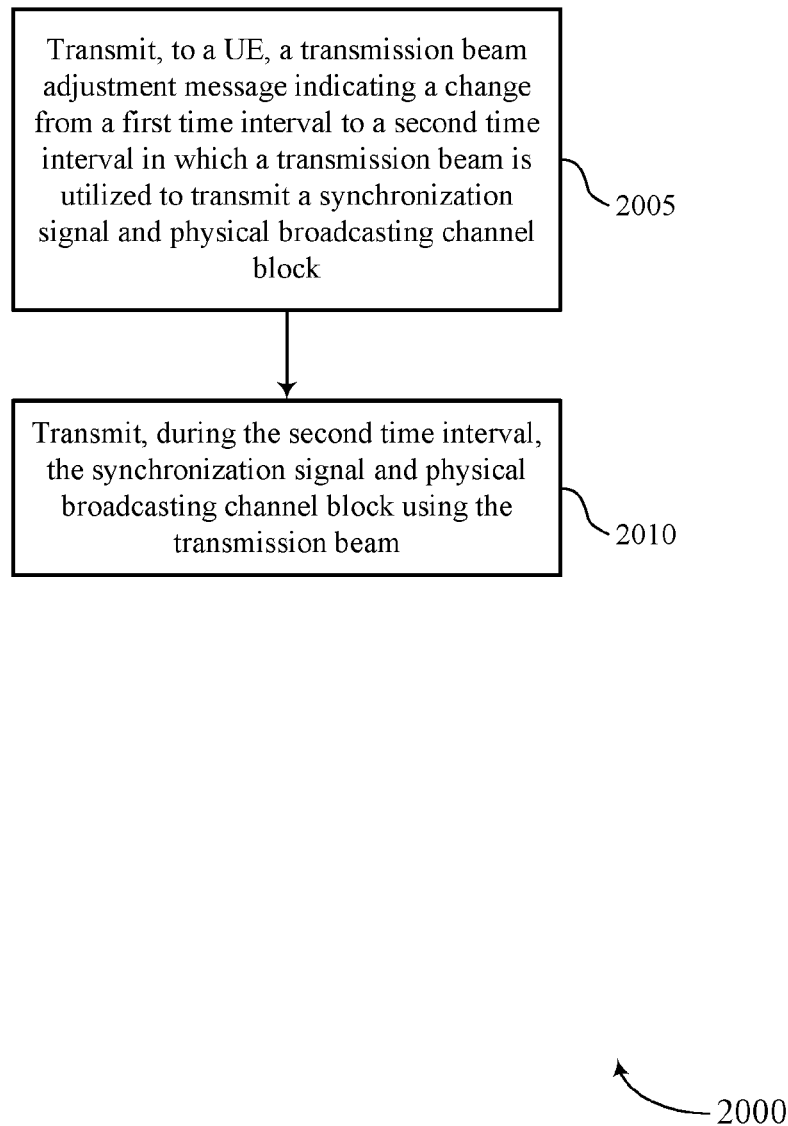

FIG. 20 shows a flowchart illustrating a method 2000 that supports indication of synchronization signal and physical broadcasting channel block transmission beam adjustment in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE, a transmission beam adjustment message indicating a change from a first time interval to a second time interval in which a transmission beam is utilized to transmit a synchronization signal and physical broadcasting channel block. The operations of 2005 may be performed according to the methods described herein. In some examples, aspects of the operations of 2005 may be performed by a time interval manager as described with reference to FIGS. 14 through 17.

At 2010, the base station may transmit, during the second time interval, the synchronization signal and physical broadcasting channel block using the transmission beam. The operations of 2010 may be performed according to the methods described herein. In some examples, aspects of the operations of 2010 may be performed by a transmission beam adjustment manager as described with reference to FIGS. 14 through 17.

Figure 21:
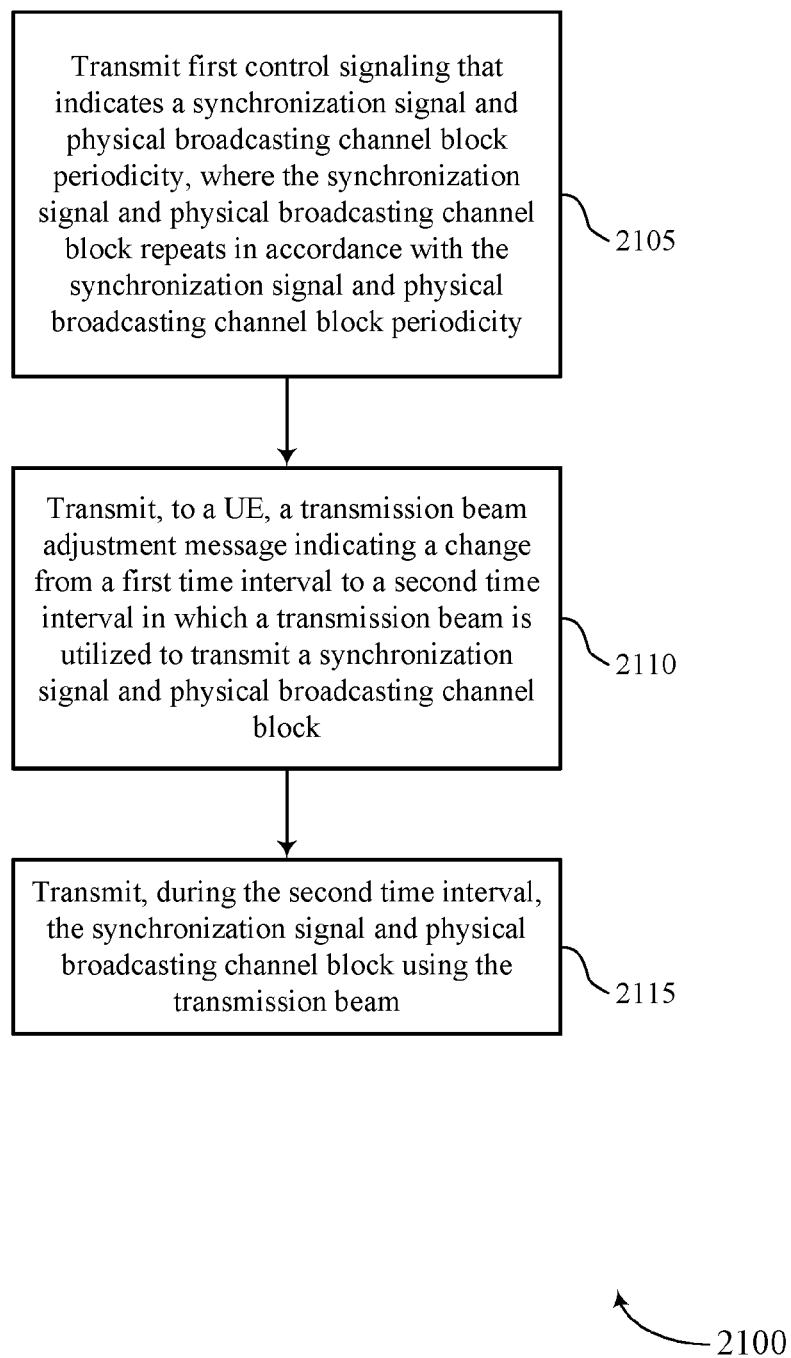

FIG. 21 shows a flowchart illustrating a method 2100 that supports indication of synchronization signal and physical broadcasting channel block transmission beam adjustment in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2105, the base station may transmit first control signaling that indicates a synchronization signal and physical broadcasting channel block periodicity, where the synchronization signal and physical broadcasting channel block repeats in accordance with the synchronization signal and physical broadcasting channel block periodicity. The operations of 2105 may be performed according to the methods described herein. In some examples, aspects of the operations of 2105 may be performed by a control signal manager as described with reference to FIGS. 14 through 17.

At 2110, the base station may transmit, to UE, a transmission beam adjustment message indicating a change from a first time interval to a second time interval in which a transmission beam is utilized to transmit the synchronization signal and physical broadcasting channel block. The operations of 2110 may be performed according to the methods described herein. In some examples, aspects of the operations of 2110 may be performed by a time interval manager as described with reference to FIGS. 14 through 17.

At 2115, the base station may transmit, during the second time interval, the synchronization signal and physical broadcasting channel block using the transmission beam. The operations of 2115 may be performed according to the methods described herein. In some examples, aspects of the operations of 2115 may be performed by a transmission beam adjustment manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Although aspects of an LTE, UE-A, UE-A Pro, or NR system may be described for purposes of example, and LTE, UE-A, UE-A Pro, or NR terminology may be used in much of the description, the techniques described herein are applicable beyond UE, UE-A, UE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims. "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    monitoring, during a first time interval of a first synchronization signal and broadcasting channel block period, a synchronization signal and physical broadcasting channel block using a receive beam that corresponds to a transmission beam;
    receiving a transmission beam adjustment message indicating a change from the first time interval to a second time interval in which the transmission beam is utilized to transmit the synchronization signal and physical broadcasting channel block; and
    monitoring, during the second time interval of a second synchronization signal and broadcasting channel block period, the synchronization signal and physical broadcasting channel block using the receive beam that corresponds to the transmission beam.

2. The method of claim 1, wherein monitoring, during the second time interval, the synchronization signal and physical broadcasting channel block comprises:
receiving, during the second time interval, the synchronization signal and physical broadcasting channel block using the receive beam.

3. The method of claim 1, wherein receiving the transmission beam adjustment message comprises:
receiving the transmission beam adjustment message indicating a change of one or more time intervals in which at least one transmission beam of a transmission beam pattern is utilized.

4. The method of claim 1, further comprising:
receiving a second transmission beam adjustment message indicating the transmission beam is no longer utilized for any time interval of a transmission beam pattern.

5. The method of claim 4, further comprising:
performing beam scanning to identify a second transmission beam and a corresponding time interval in which the second transmission beam is utilized to transmit the second synchronization signal and physical broadcasting channel block.

6. The method of claim 1, wherein receiving the transmission beam adjustment message comprises:
receiving the transmission beam adjustment message indicating a transmission beam index array that indicates that a respective transmission beam of a transmission beam pattern is utilized for a respective time interval of a plurality of different time intervals.

7. The method of claim 6, wherein a respective element of the transmission beam index array indicates a respective time interval of the plurality of different time intervals, and wherein at least one transmission beam is utilized prior to receiving the transmission beam adjustment message.

8. The method of claim 6, wherein the transmission beam index array includes a defined value corresponding to at least one time interval of the plurality of different time intervals to indicate that a new transmission beam is being utilized to transmit within the at least one time interval.

9. The method of claim 1, further comprising:
receiving first control signaling that indicates a synchronization signal and physical broadcasting channel block periodicity, wherein the synchronization signal and physical broadcasting channel block repeats using a plurality of transmission beams in accordance with the synchronization signal and physical broadcasting channel block periodicity.

10. The method of claim 9, further comprising:
receiving second control signaling that indicates a master information block periodicity, wherein the master information block periodicity has a longer duration than the synchronization signal and physical broadcasting channel block periodicity.

11. The method of claim 1, wherein receiving the transmission beam adjustment message comprises:
receiving the transmission beam adjustment message that is individually addressed to the UE.

12. The method of claim 11, wherein the transmission beam adjustment message indicates the second time interval, and wherein the transmission beam of the synchronization signal and physical broadcasting channel block that is received by the UE prior to receiving the transmission beam adjustment message is utilized in the second time interval after receiving the transmission beam adjustment message.

13. The method of claim 11, wherein the transmission beam adjustment message indicates that the transmission beam of the synchronization signal and physical broadcasting channel block that is received by the UE prior to receiving the transmission beam adjustment message is not to be utilized after receiving the transmission beam adjustment message.

14. The method of claim 1, wherein receiving the transmission beam adjustment message comprises:
receiving the transmission beam adjustment message that is addressed to a group of UEs that includes the UE.

15. The method of claim 14, wherein the transmission beam adjustment message indicates the second time interval, and wherein the transmission beam of the synchronization signal and physical broadcasting channel block that is received by the group of UEs that includes the UE prior to receiving the transmission beam adjustment message is utilized in the second time interval after receiving the transmission beam adjustment message.

16. The method of claim 14, wherein the transmission beam adjustment message indicates that the transmission beam of the synchronization signal and physical broadcasting channel block that is received by the group of UEs that includes the UE prior to receiving the transmission beam adjustment message is not to be utilized during any time interval after receiving the transmission beam adjustment message.

17. The method of claim 14, wherein the transmission beam adjustment message is group-common downlink control information.

18. The method of claim 1, further comprising:
receiving a first synchronization signal and physical broadcasting channel block value during the first time interval prior to receiving the transmission beam adjustment message and a second synchronization signal and physical broadcasting channel block value during the second time interval after receiving the transmission beam adjustment message; and
combining the first synchronization signal and physical broadcasting channel block value with the second synchronization signal and physical broadcasting channel block value to detect a synchronization signal, decode a physical broadcasting channel, or both detect the synchronization signal and decode the physical broadcasting channel.

19. The method of claim 1, further comprising:
transmitting a random access preamble during a random access resource corresponding to the second time interval.

20. The method of claim 1, further comprising:
receiving data transfer quasi co-location information that indicates the second time interval; and
monitoring for a data transmission using the receive beam based at least in part on the data transfer quasi co-location information.

21. A method for wireless communications by a network entity, comprising:
transmitting, to a user equipment (UE), a transmission beam adjustment message indicating a change from a first time interval to a second time interval in which a transmission beam is utilized to transmit a synchronization signal and physical broadcasting channel block, wherein the first time interval corresponds to a first synchronization signal and broadcasting channel block period; and
transmitting, during the second time interval of a second synchronization signal and broadcasting channel block period, the synchronization signal and physical broadcasting channel block using the transmission beam.

22. The method of claim 21, wherein transmitting the transmission beam adjustment message comprises:
transmitting the transmission beam adjustment message indicating a change of one or more time intervals in which at least one transmission beam of a transmission beam pattern is utilized.

23. The method of claim 21, further comprising:
transmitting a second transmission beam adjustment message indicating the transmission beam is no longer utilized for any time interval of a transmission beam pattern.

24. The method of claim 21, wherein transmitting the transmission beam adjustment message comprises:
transmitting the transmission beam adjustment message indicating a transmission beam index array that indicates that a respective transmission beam of a transmission beam pattern is utilized for a respective time interval of a plurality of different time intervals.

25. The method of claim 21, further comprising:
transmitting first control signaling that indicates a synchronization signal and physical broadcasting channel block periodicity, wherein the synchronization signal and physical broadcasting channel block repeats in accordance with the synchronization signal and physical broadcasting channel block periodicity.

26. The method of claim 25, further comprising:
transmitting second control signaling that indicates a master information block periodicity, wherein the master information block periodicity has a longer duration than the synchronization signal and physical broadcasting channel block periodicity.

27. The method of claim 21, wherein transmitting the transmission beam adjustment message comprises:
transmitting the transmission beam adjustment message that is individually addressed to the UE.

28. The method of claim 21, wherein transmitting the transmission beam adjustment message comprises:
transmitting the transmission beam adjustment message that is addressed to a group of UEs that includes the UE.

29. The method of claim 21, further comprising:
receiving a random access preamble during a random access resource corresponding to the second time interval.

30. The method of claim 21, further comprising:
transmitting data transfer quasi co-location information that indicates the second time interval; and
transmitting a data transmission using the transmission beam based at least in part on the data transfer quasi co-location information.

31. An apparatus for wireless communications by a user equipment (UE), comprising:
at least one processor,
at least one memory coupled with the at least one processor; and
instructions stored in the at least one memory and executable by the at least one processor to cause the apparatus to:
monitor, during a first time interval of a first synchronization signal and broadcasting channel block period, a synchronization signal and physical broadcasting channel block using a receive beam that corresponds to a transmission beam;
receive a transmission beam adjustment message indicating a change from the first time interval to a second time interval in which the transmission beam is utilized to transmit the synchronization signal and physical broadcasting channel block; and
monitor, during the second time interval of a second synchronization signal and broadcasting channel block period, the synchronization signal and physical broadcasting channel block using the receive beam that corresponds to the transmission beam.

32. The apparatus of claim 31, wherein the instructions to monitor, during the second time interval, the synchronization signal and physical broadcasting channel block are executable by the at least one processor to cause the apparatus to: receive, during the second time interval, the synchronization signal and physical broadcasting channel block using the receive beam.

33. An apparatus for wireless communications by a network entity, comprising:
at least one processor,
at least one memory coupled with the at least one processor; and
instructions stored in the at least one memory and executable by the at least one processor to cause the apparatus to:
transmit, to a user equipment (UE), a transmission beam adjustment message indicating a change from a first time interval to a second time interval in which a transmission beam is utilized to transmit a synchronization signal and physical broadcasting channel block, wherein the first time interval corresponds to a first synchronization signal and broadcasting channel block period; and
transmit, during the second time interval of a second synchronization signal and broadcasting channel block period, the synchronization signal and physical broadcasting channel block using the transmission beam.

34. The apparatus of claim 33, wherein the instructions to transmit the transmission beam adjustment message are executable by the at least one processor to cause the apparatus to:
transmit the transmission beam adjustment message indicating a change of one or more time intervals in which at least one transmission beam of a transmission beam pattern is utilized.

35. A non-transitory computer-readable medium storing code for wireless communications by a user equipment (UE), the code comprising instructions executable by a processor to:
monitor, during a first time interval of a first synchronization signal and broadcasting channel block period, a synchronization signal and physical broadcasting channel block using a receive beam that corresponds to a transmission beam;
receive a transmission beam adjustment message indicating a change from the first time interval to a second time interval in which the transmission beam is utilized to transmit the synchronization signal and physical broadcasting channel block; and
monitor, during the second time interval of a second synchronization signal and broadcasting channel block period, the synchronization signal and physical broadcasting channel block using a receive beam that corresponds to the transmission beam.

* * * * *